(12) United States Patent
Yang et al.

(10) Patent No.: US 12,517,390 B2
(45) Date of Patent: Jan. 6, 2026

(54) DISPLAY DEVICE

(71) Applicant: LG ELECTRONICS INC., Seoul (KR)

(72) Inventors: Seongmo Yang, Seoul (KR); Jaebok Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/726,911

(22) PCT Filed: Jan. 6, 2022

(86) PCT No.: PCT/KR2022/000197
§ 371 (c)(1),
(2) Date: Jul. 5, 2024

(87) PCT Pub. No.: WO2023/132383
PCT Pub. Date: Jul. 13, 2023

(65) Prior Publication Data
US 2025/0102847 A1    Mar. 27, 2025

(51) Int. Cl.
*G02F 1/13357* (2006.01)
*G02F 1/1333* (2006.01)

(52) U.S. Cl.
CPC .. *G02F 1/133314* (2021.01); *G02F 1/133606* (2013.01)

(58) Field of Classification Search
CPC .............. G02F 1/133314; G02F 1/133606
See application file for complete search history.

(56) References Cited

U.S. PATENT DOCUMENTS

| 10,191,316 B2 * | 1/2019 | Wu ................ G02F 1/133308 |
| 2013/0044417 A1 | 2/2013 | Kim |
| 2013/0308074 A1 * | 11/2013 | Park ................ G02F 1/133308 362/634 |

FOREIGN PATENT DOCUMENTS

| JP | 2018-173502 A | 11/2018 |
| JP | 6917557 B2 | 8/2021 |
| KR | 10-2013-0128669 A | 11/2013 |
| KR | 10-2016-0074771 A | 6/2016 |
| KR | 10-1835116 B1 | 3/2018 |
| KR | 10-1952774 B1 | 2/2019 |
| KR | 10-2019-0021019 A | 3/2019 |

(Continued)

OTHER PUBLICATIONS

Attached is the Korean Office Action for Korean Application No. 10-2024-7021994, dated Oct. 23, 2024.

*Primary Examiner* — Donald L Raleigh
(74) *Attorney, Agent, or Firm* — Birch, Stewart, Kolasch & Birch, LLP

(57) ABSTRACT

A display device is disclosed. The display device may include: a display panel; a frame positioned behind the display panel; a light source providing light to the display panel; an optical plate positioned between the display panel and the light source; a frame which is opposite to the display panel with respect to the optical plate and on which the optical plate is seated; and a holder adjacent to one side of the optical plate and coupled onto the frame, wherein the holder comprises: a plurality of protrusions formed at one surface of the holder that faces the one side of the optical plate; and a coupling portion protruding from the holder toward the frame, passing through the frame, and engaged with a rear surface of the frame.

15 Claims, 29 Drawing Sheets

(56) References Cited

FOREIGN PATENT DOCUMENTS

| | | | |
|---|---|---|---|
| KR | 10-2196444 | B1 | 12/2020 |
| KR | 10-2206335 | B1 | 1/2021 |

* cited by examiner

[FIG. 1]
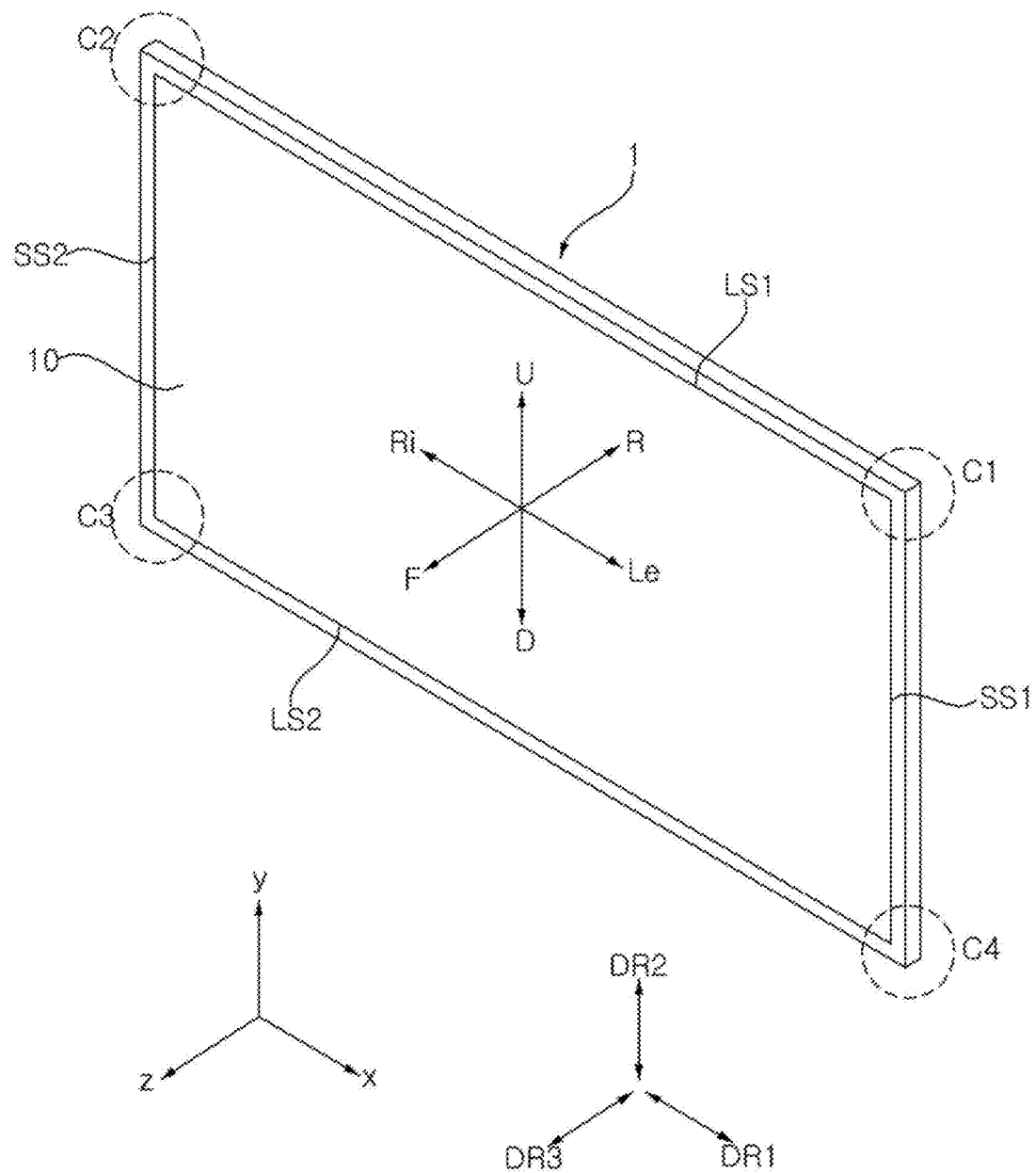

[FIG. 2]
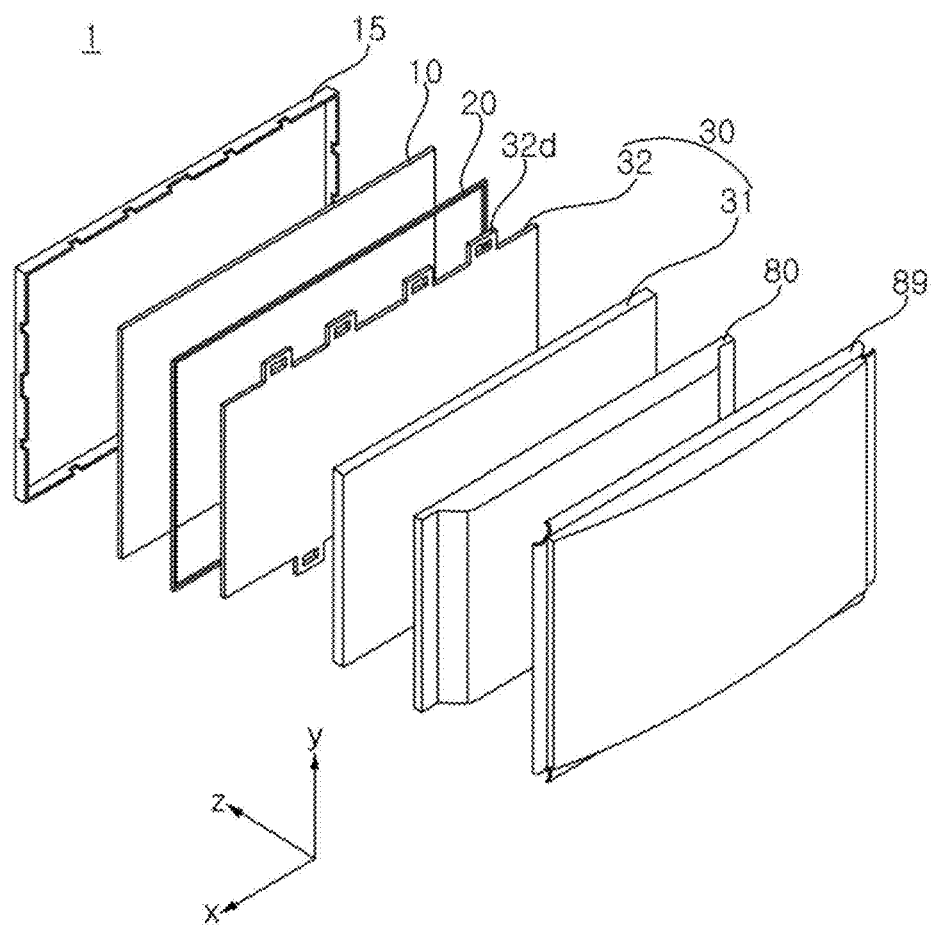

[FIG. 3]
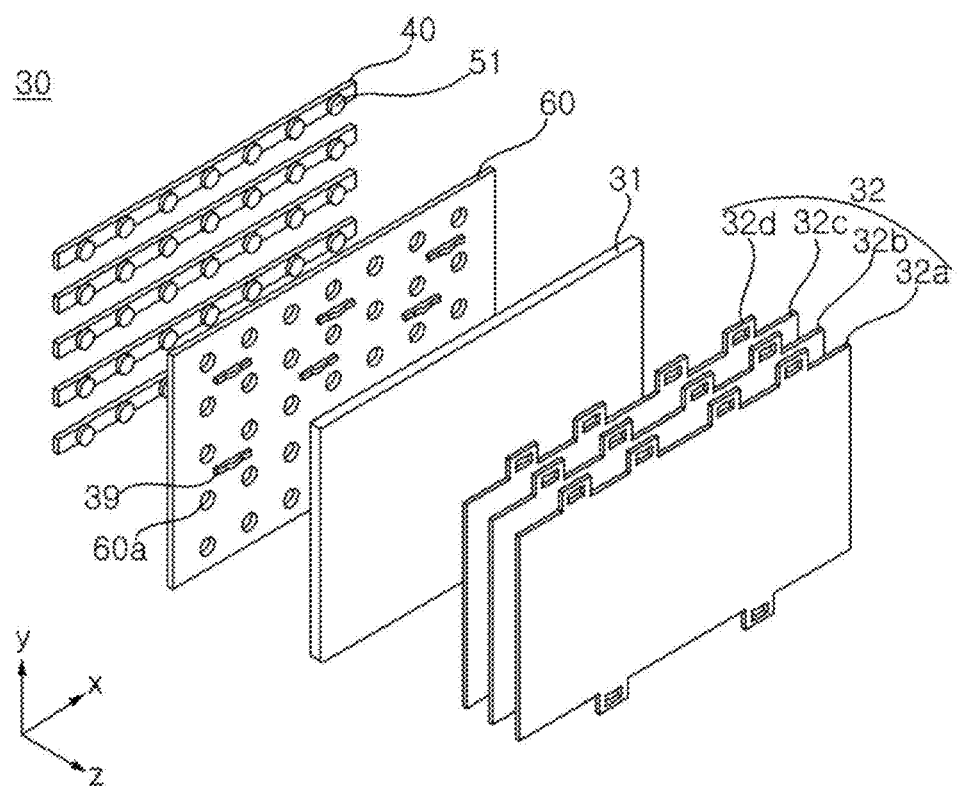

[FIG. 4]
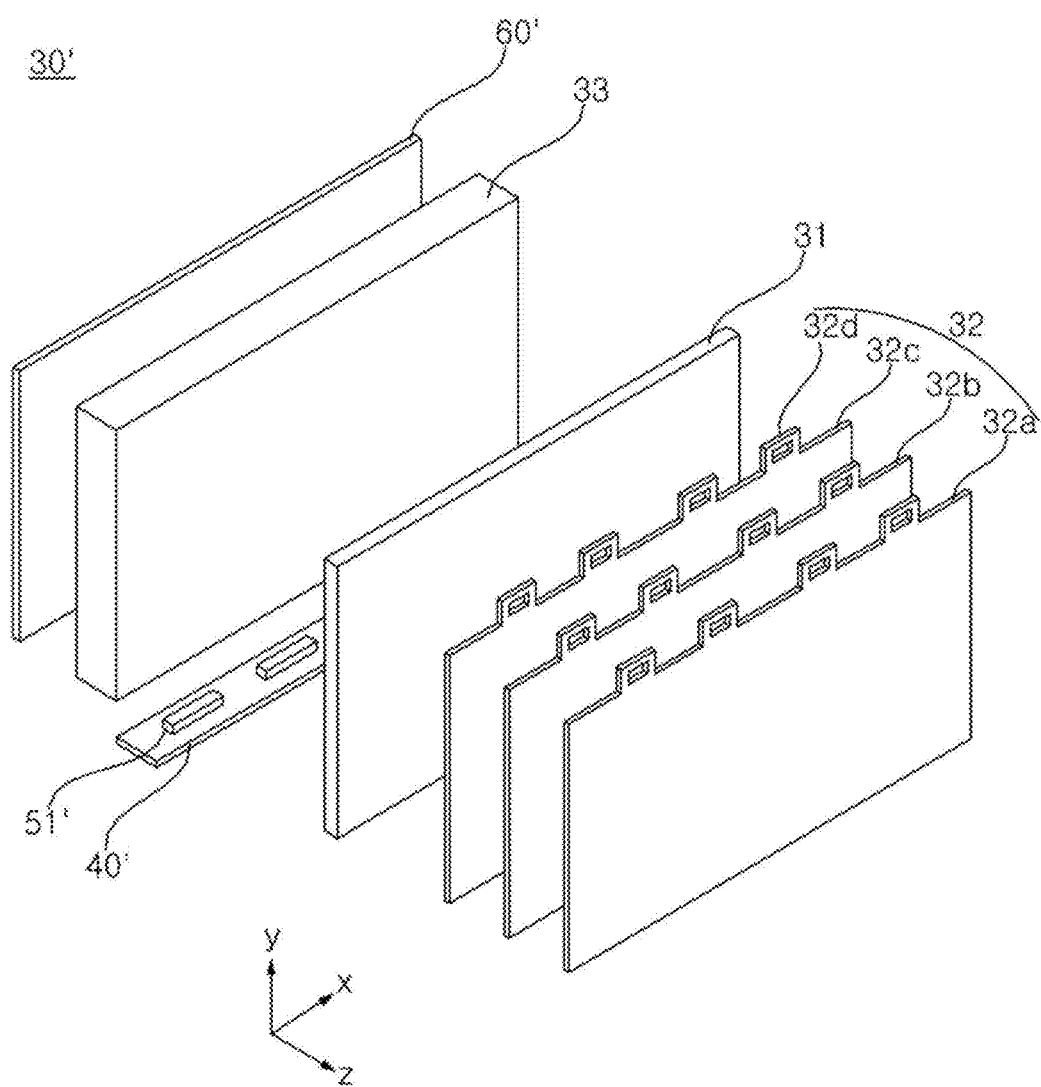

[FIG. 5]
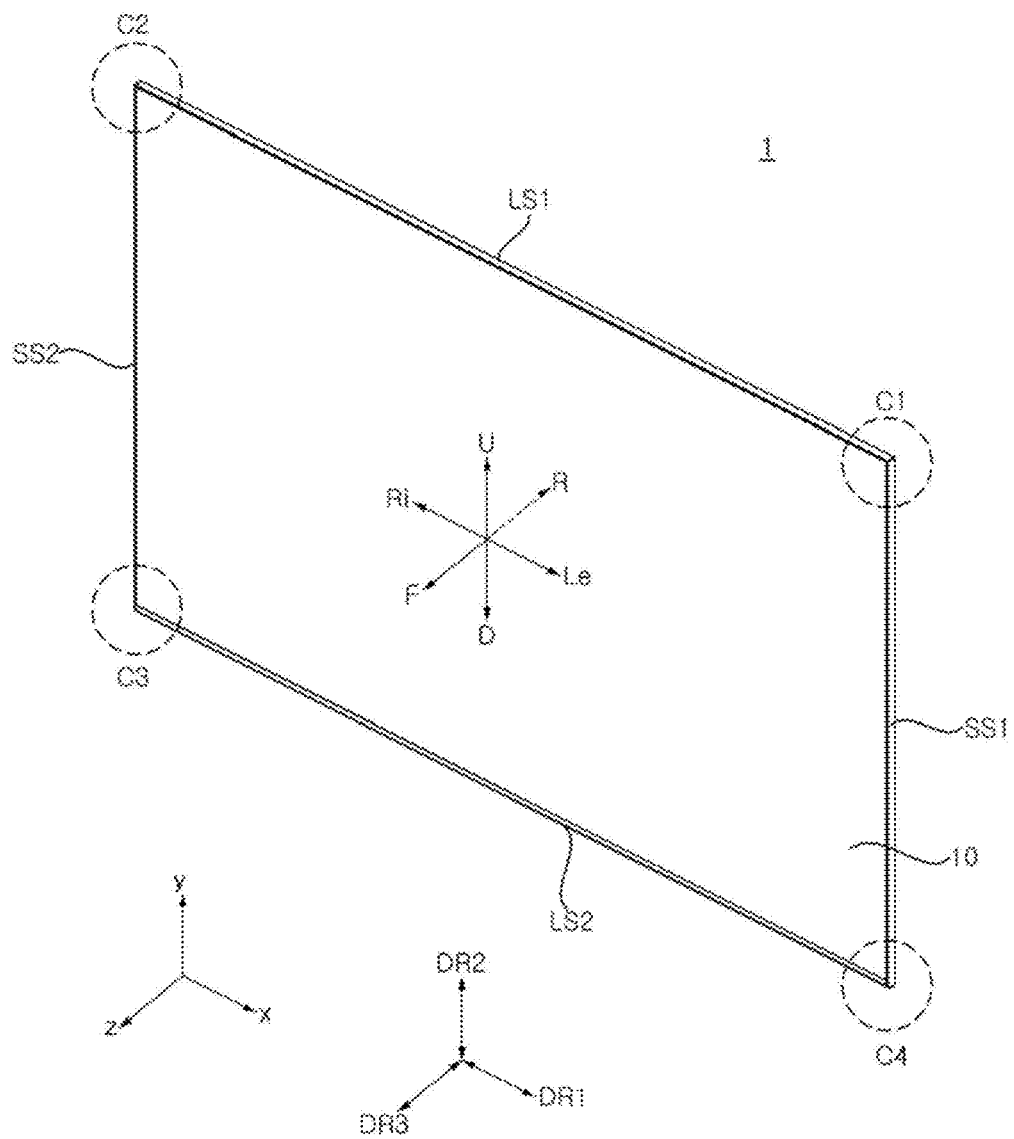

[FIG. 6]
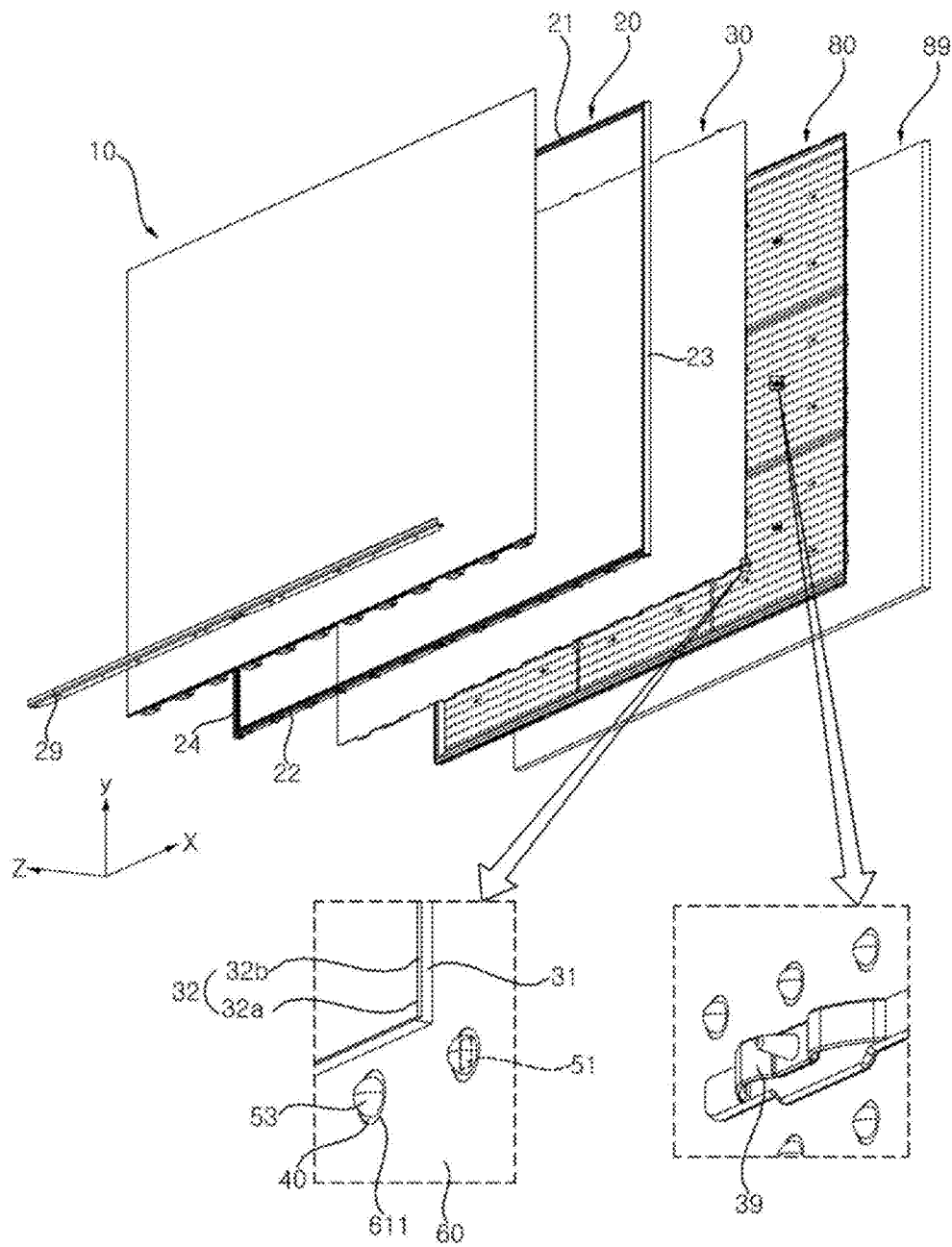

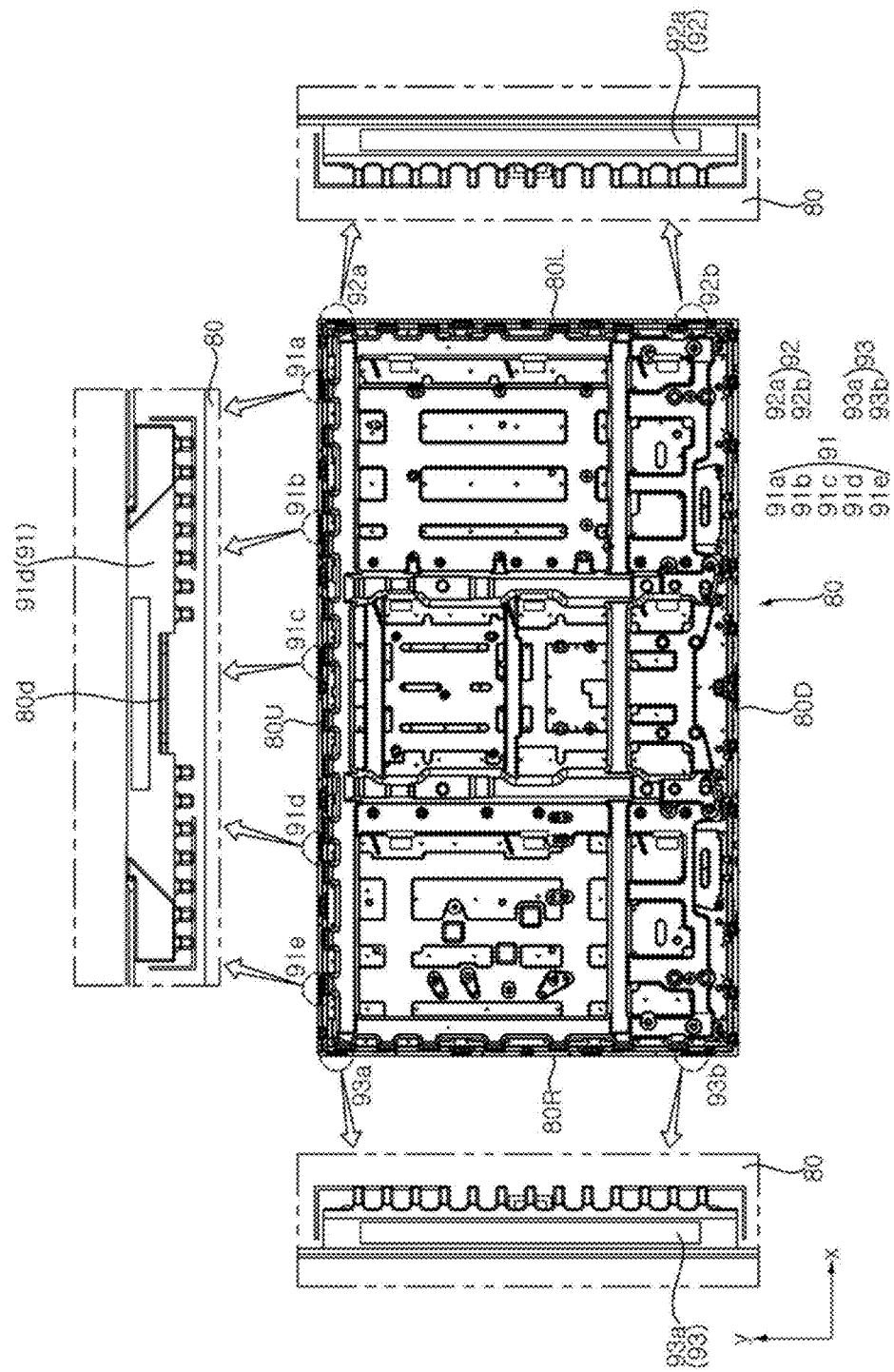

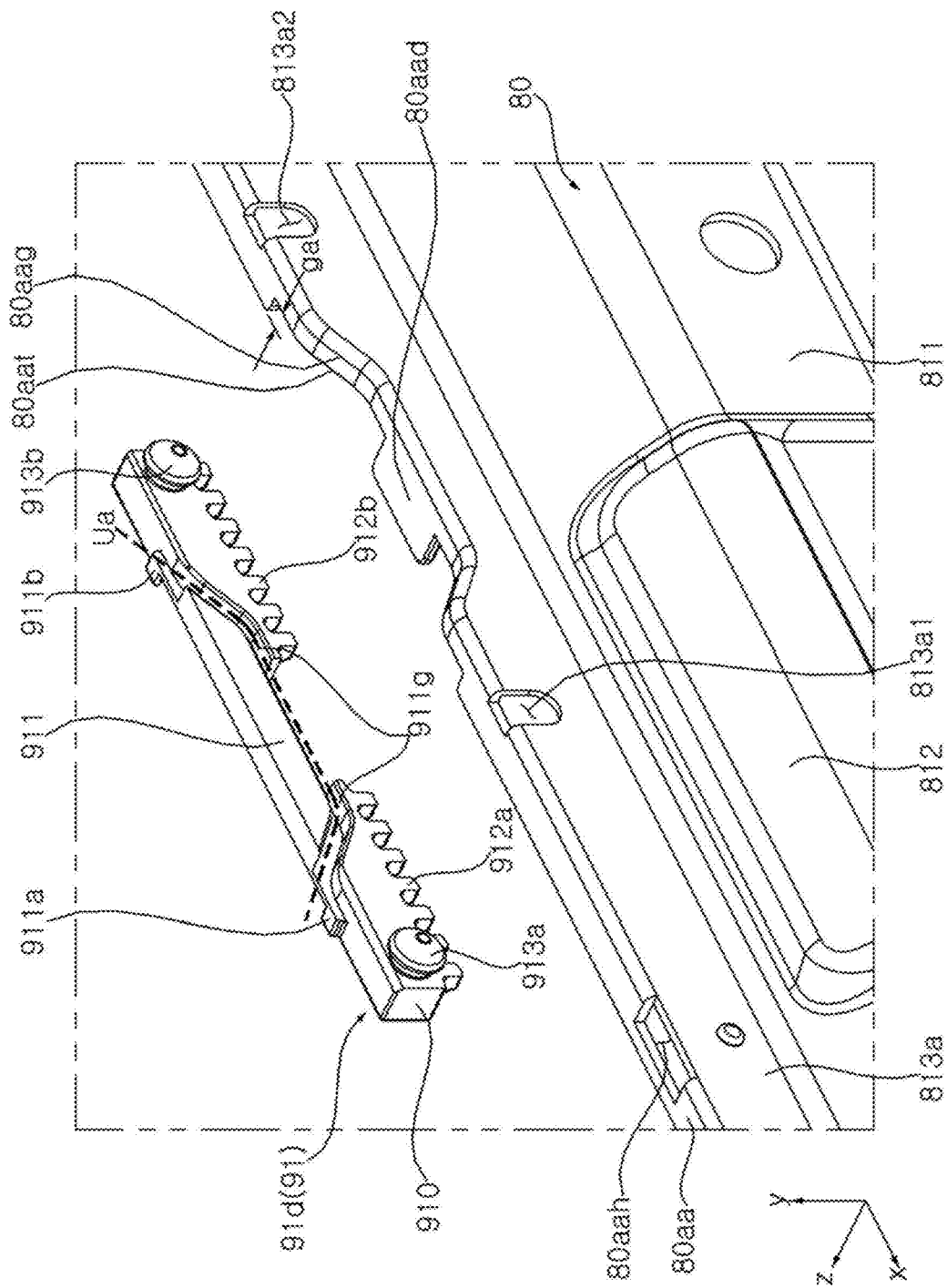

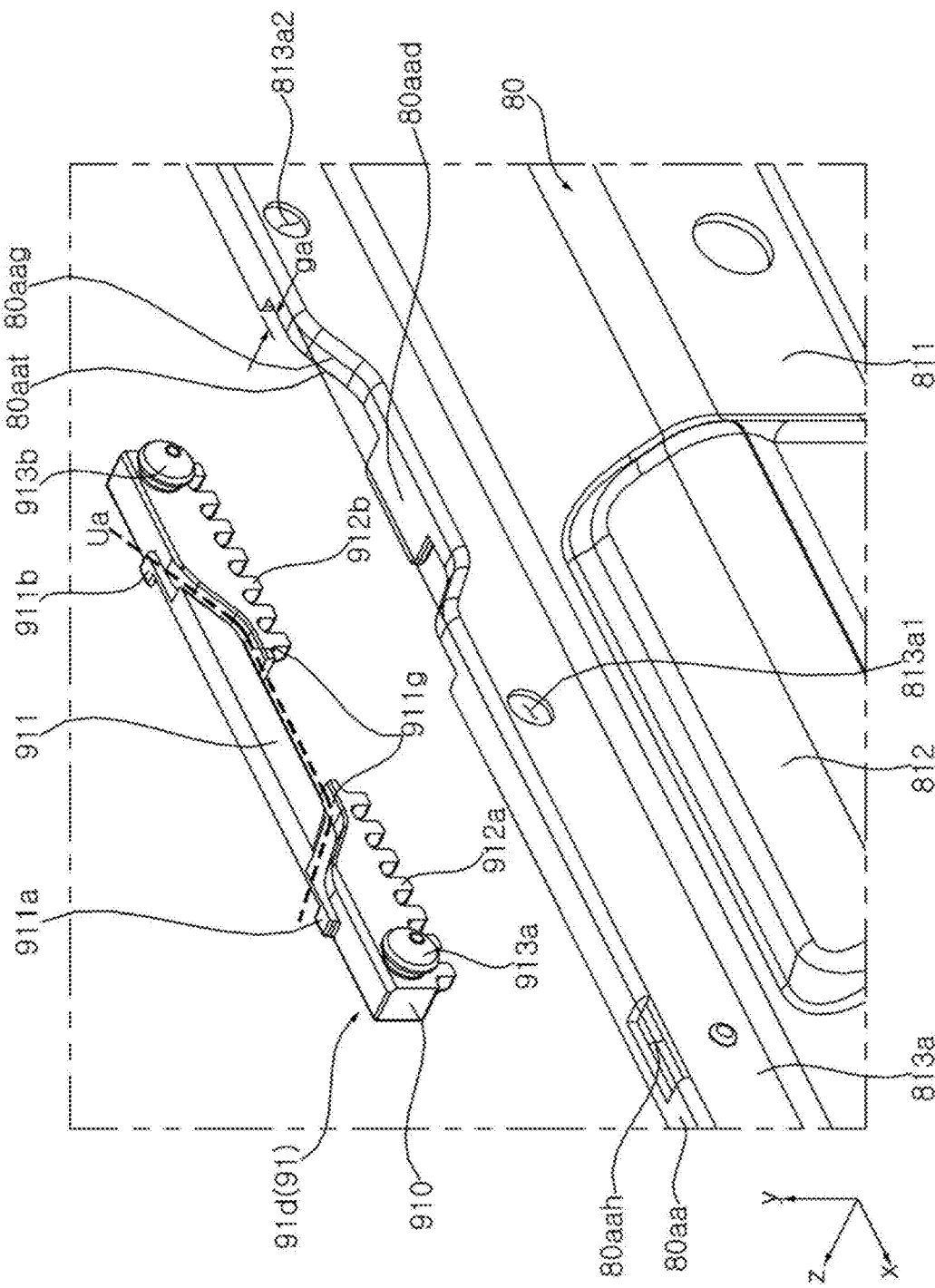
[FIG. 9]

[FIG. 10]
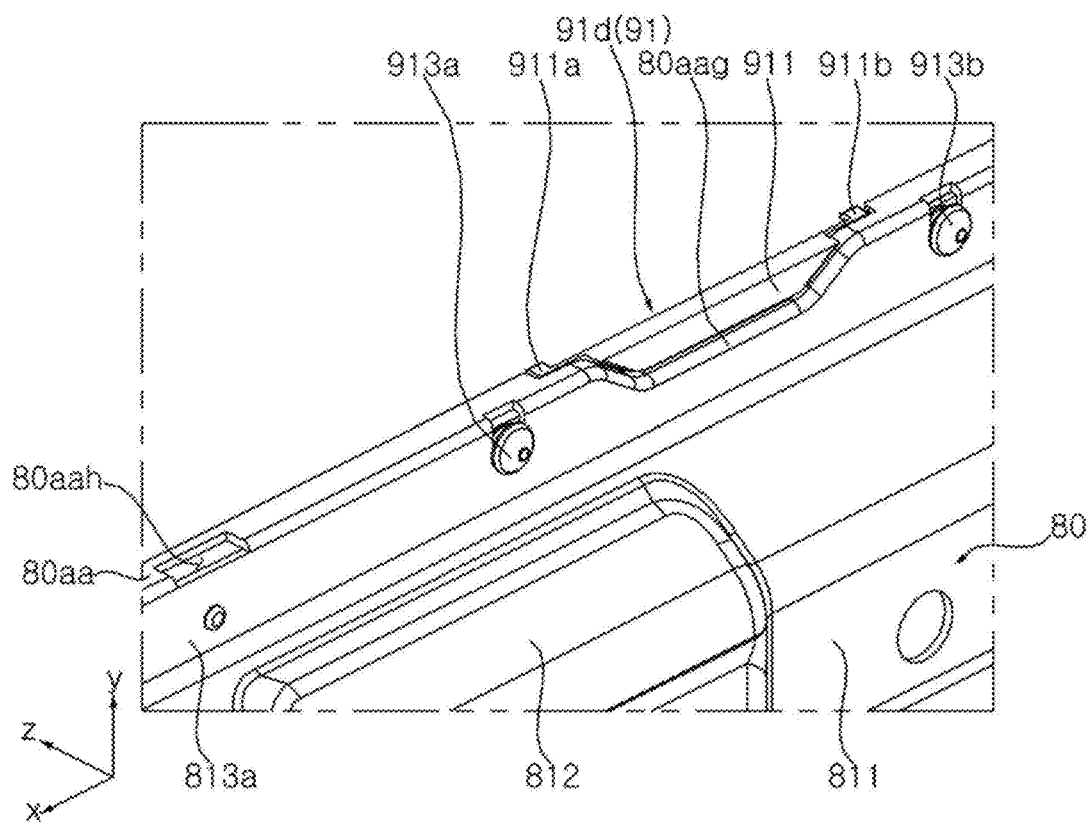

[FIG. 11]
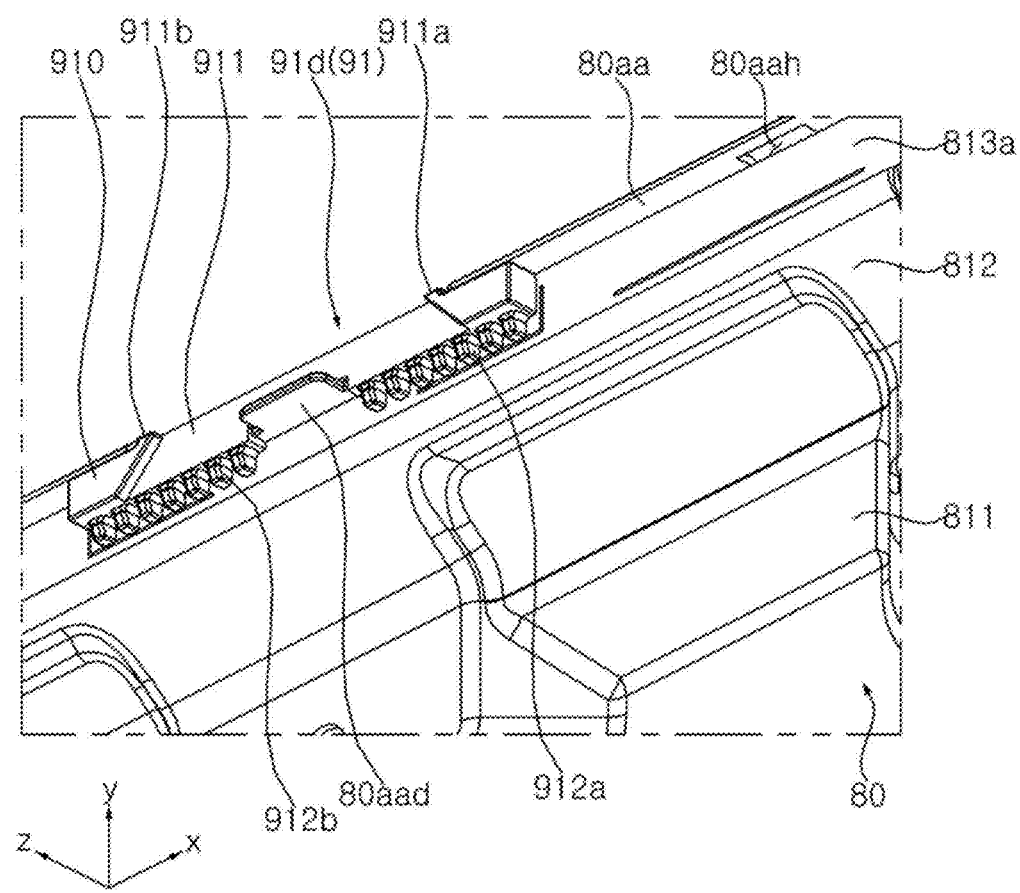

[FIG. 12]
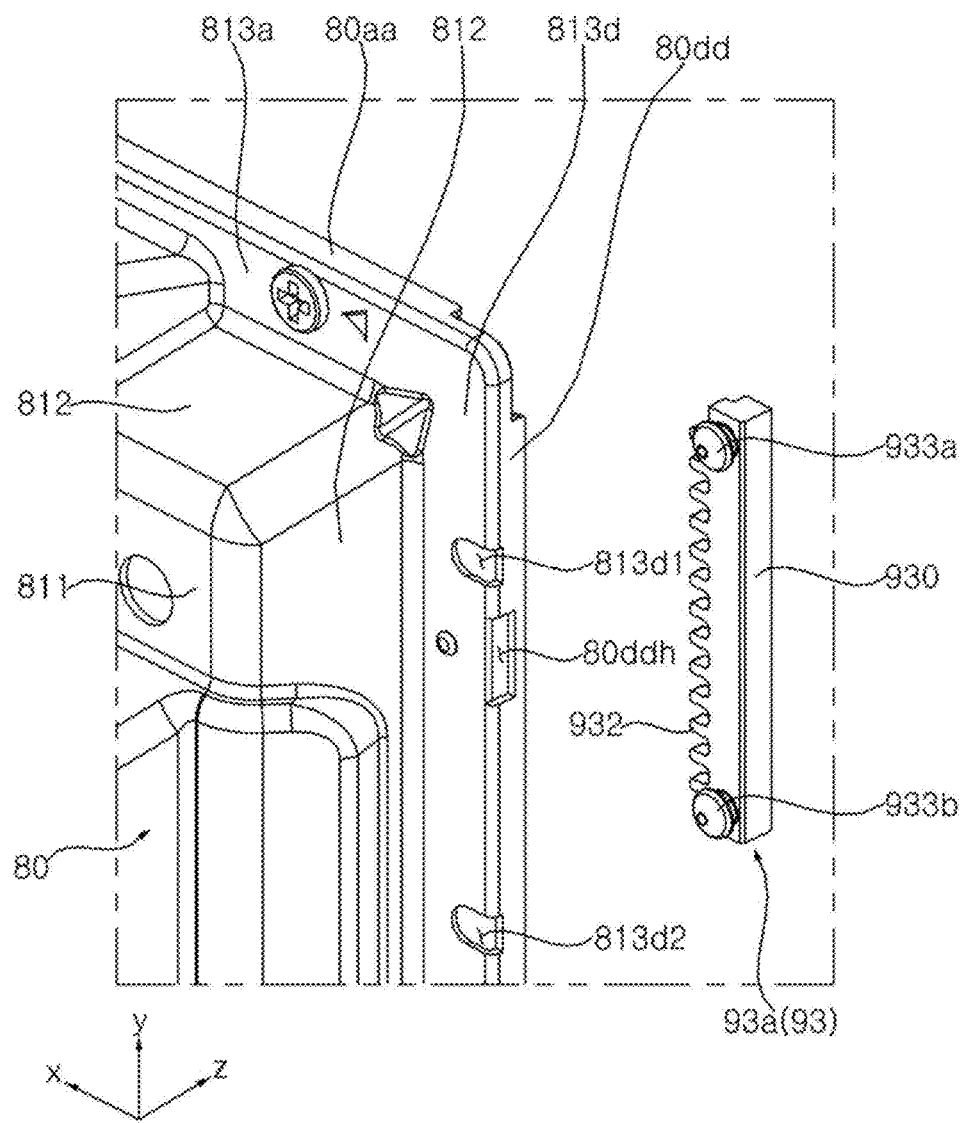

[FIG. 13]
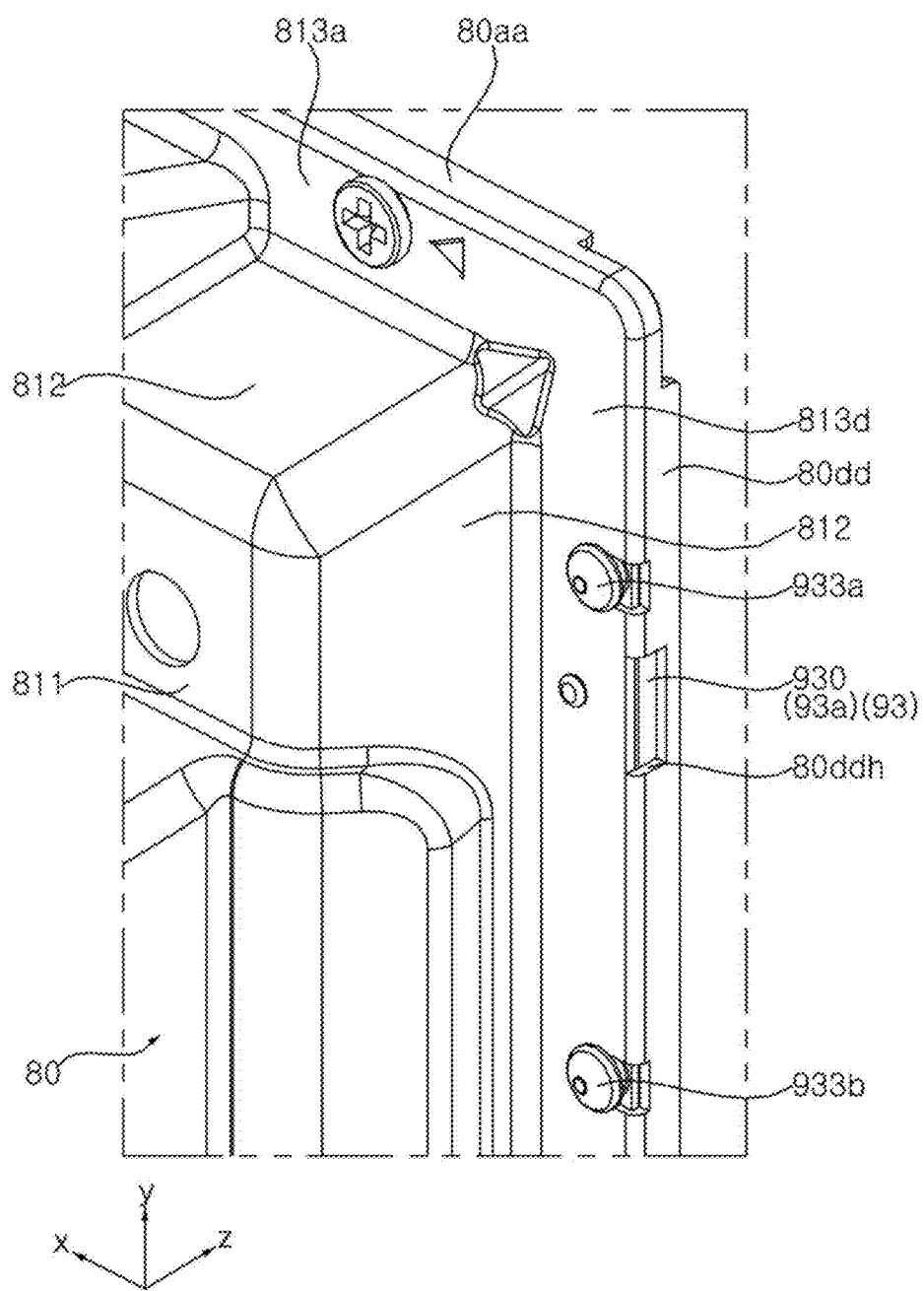

[FIG. 14]
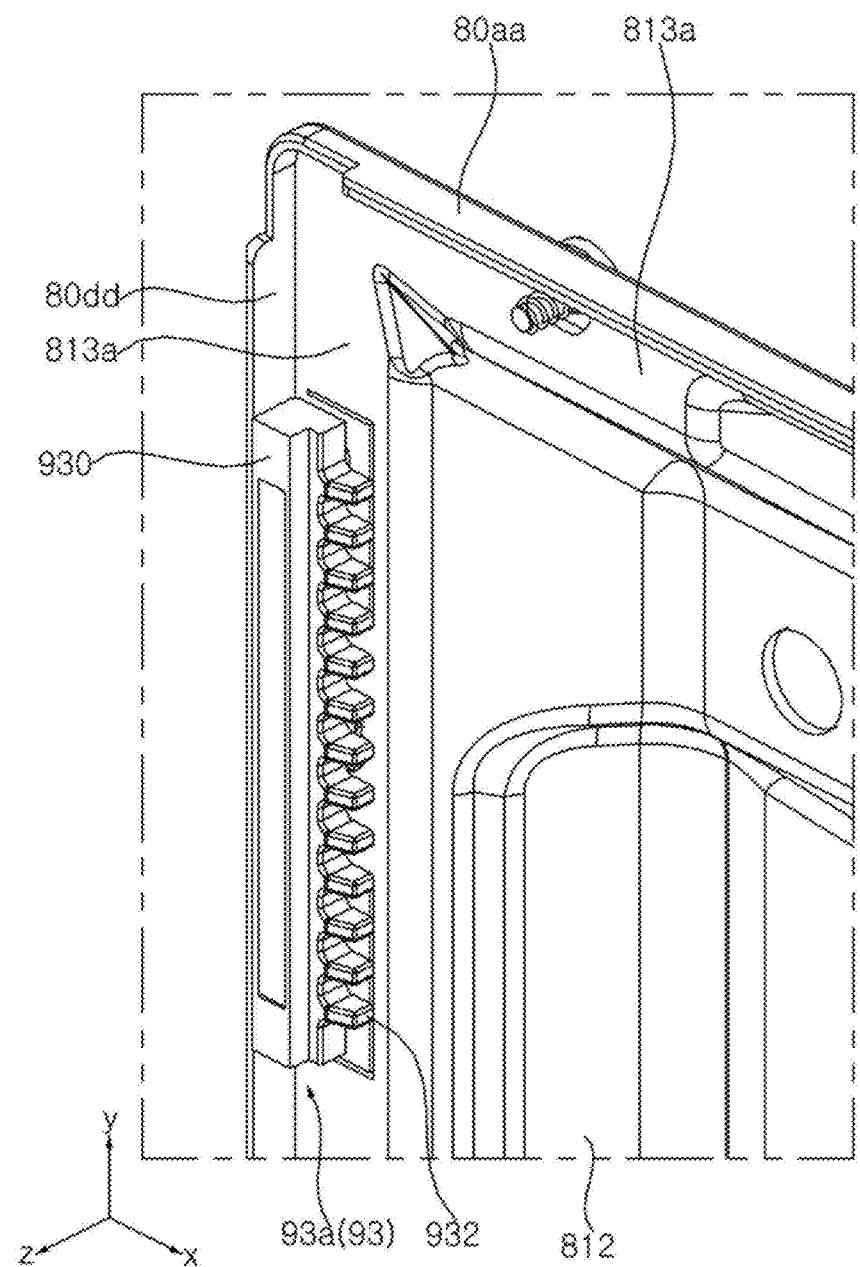

[FIG. 15]
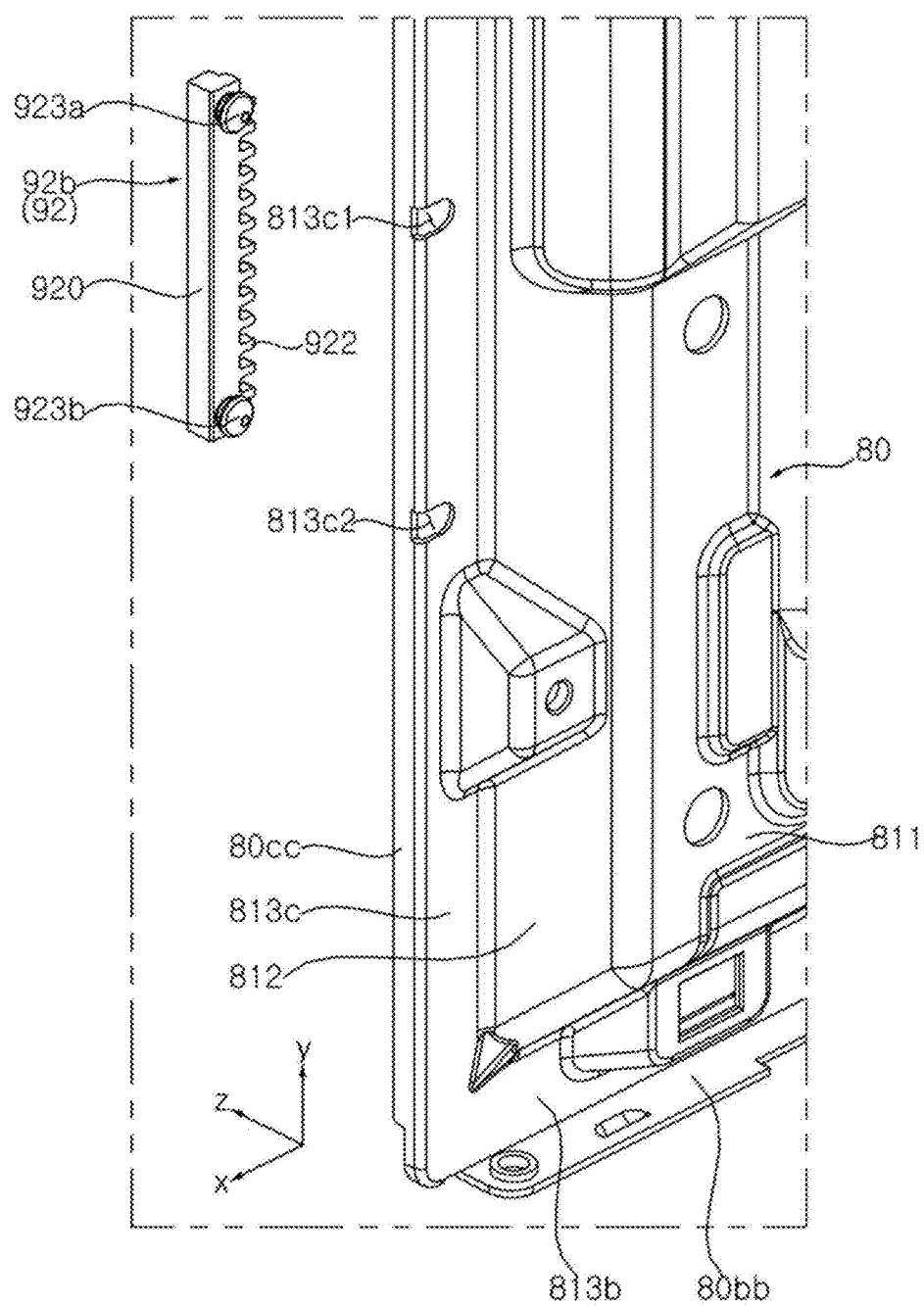

[FIG. 16]
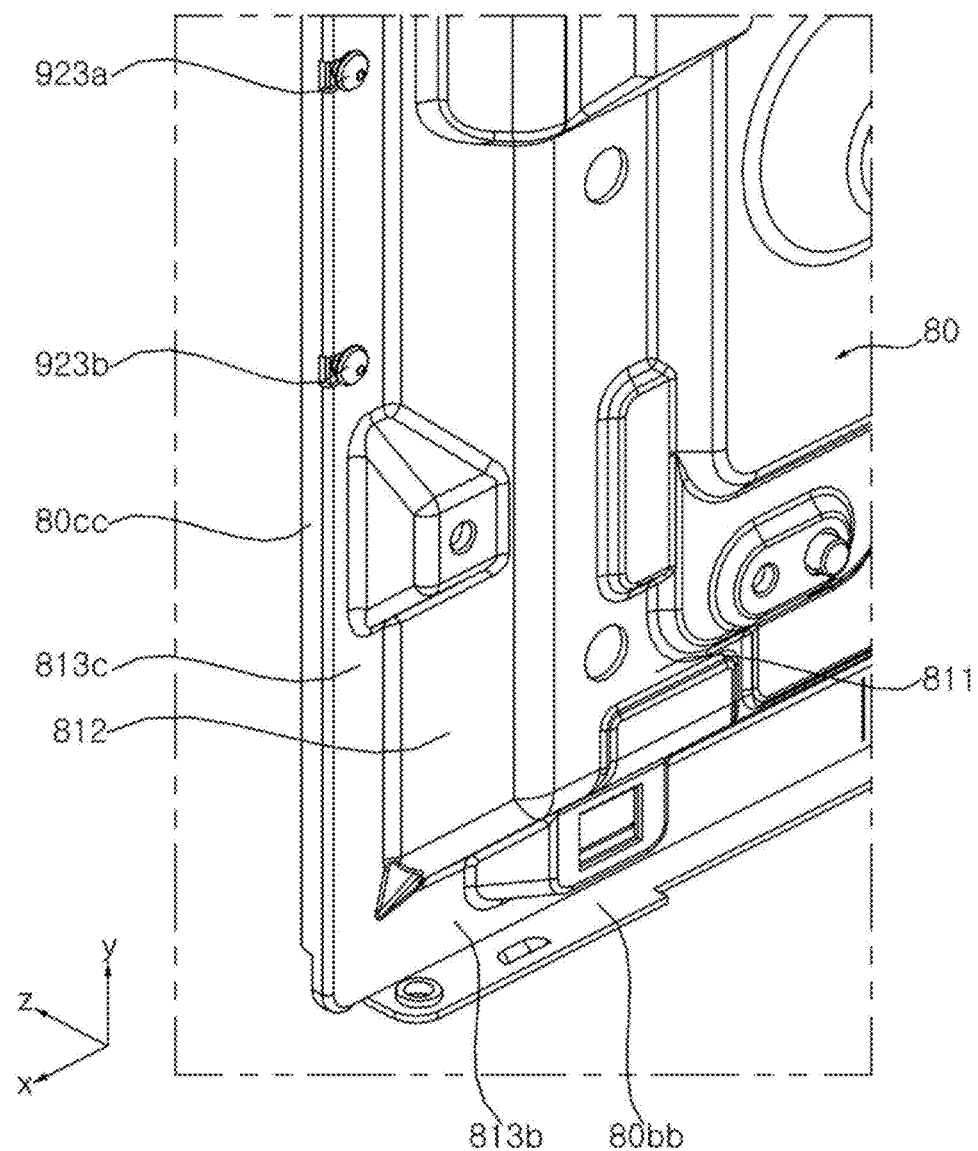

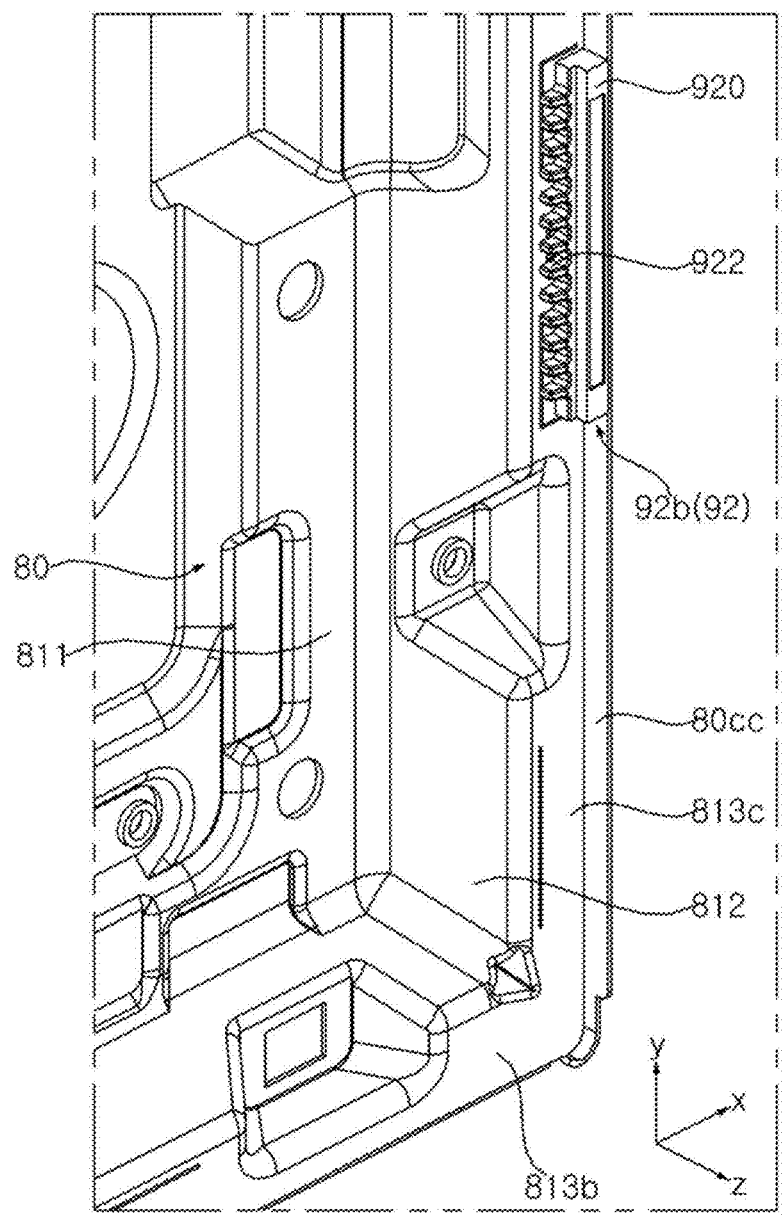
[FIG. 17]

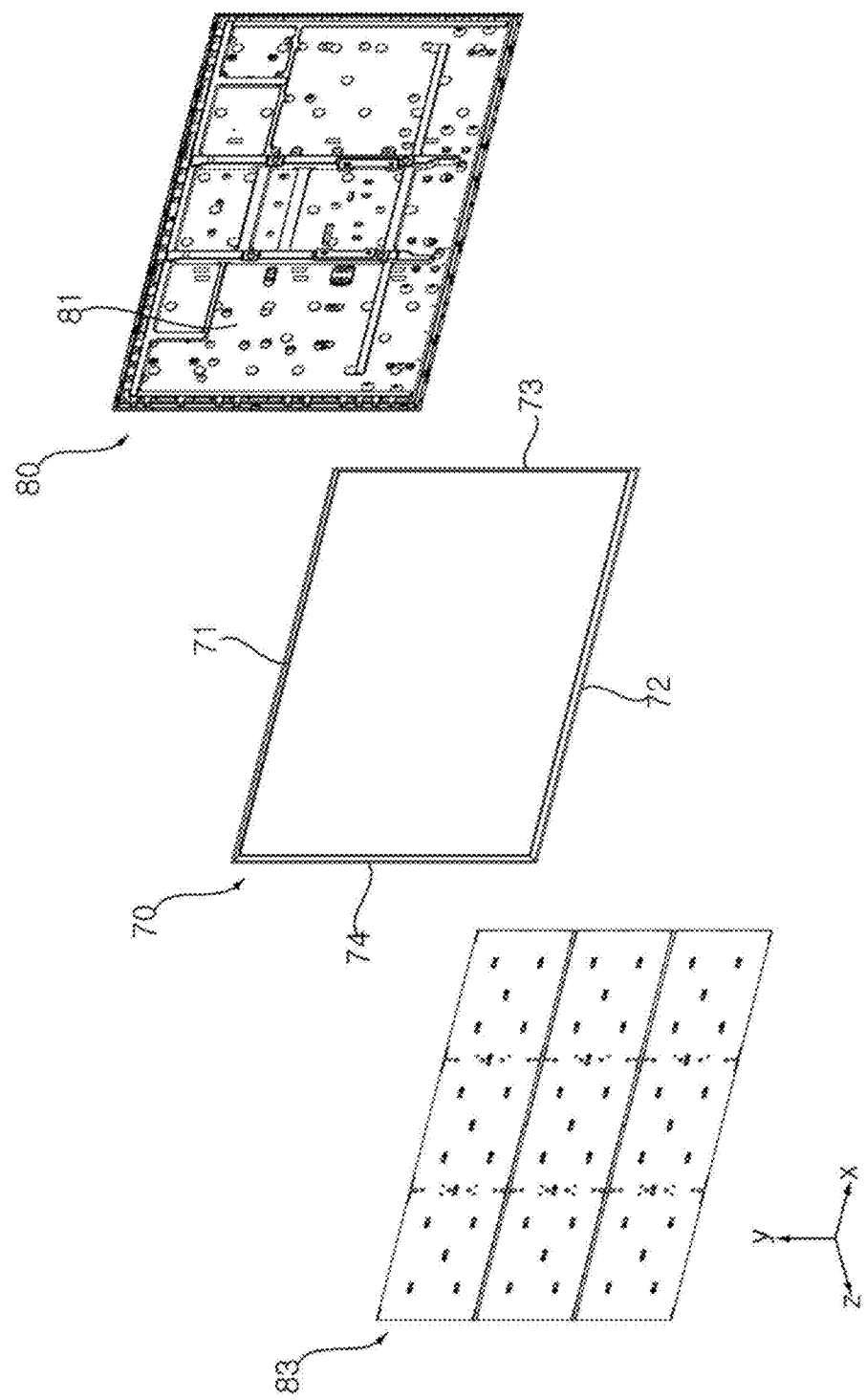
[FIG. 18]

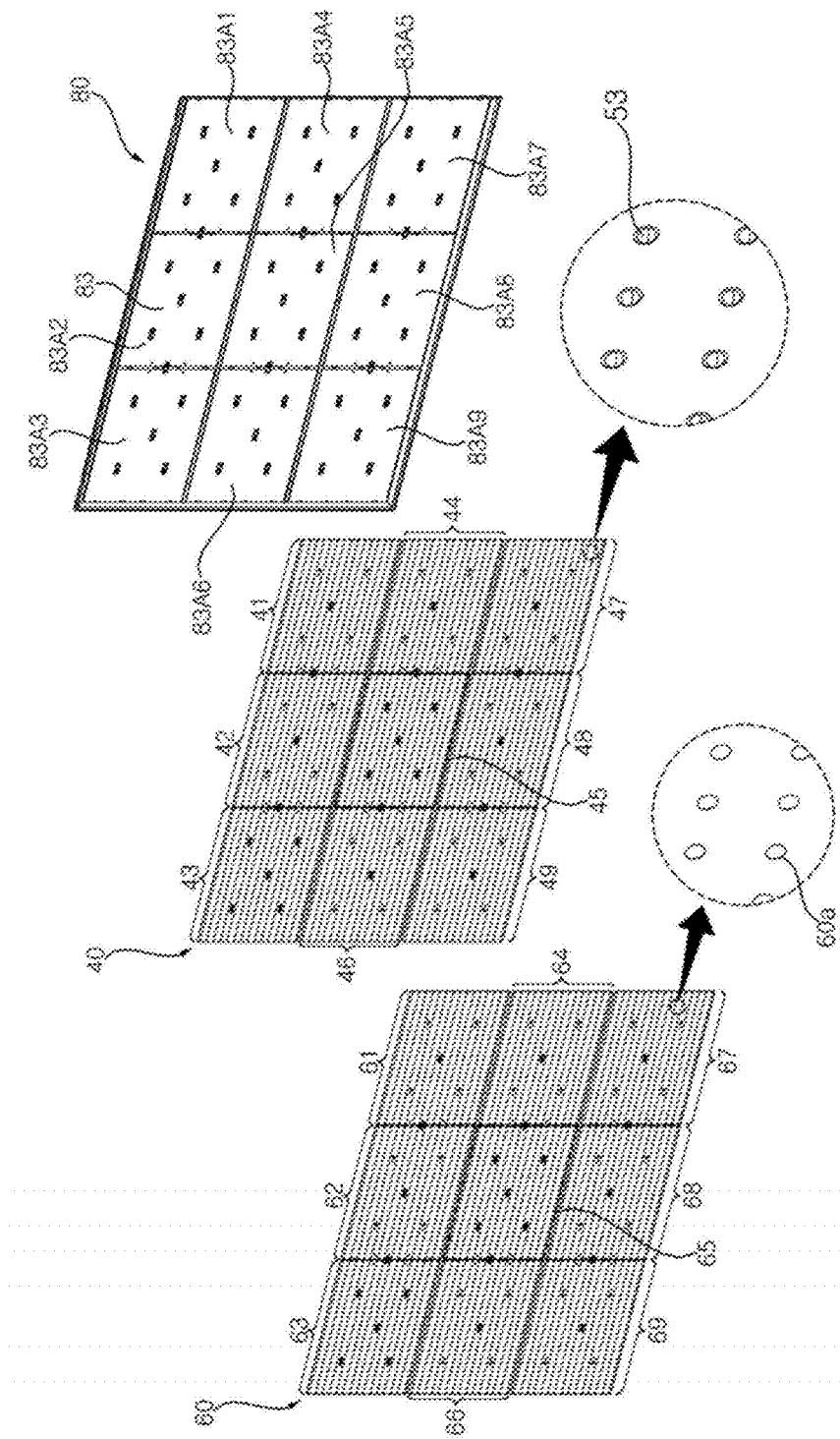
[FIG. 19]

[FIG. 20]
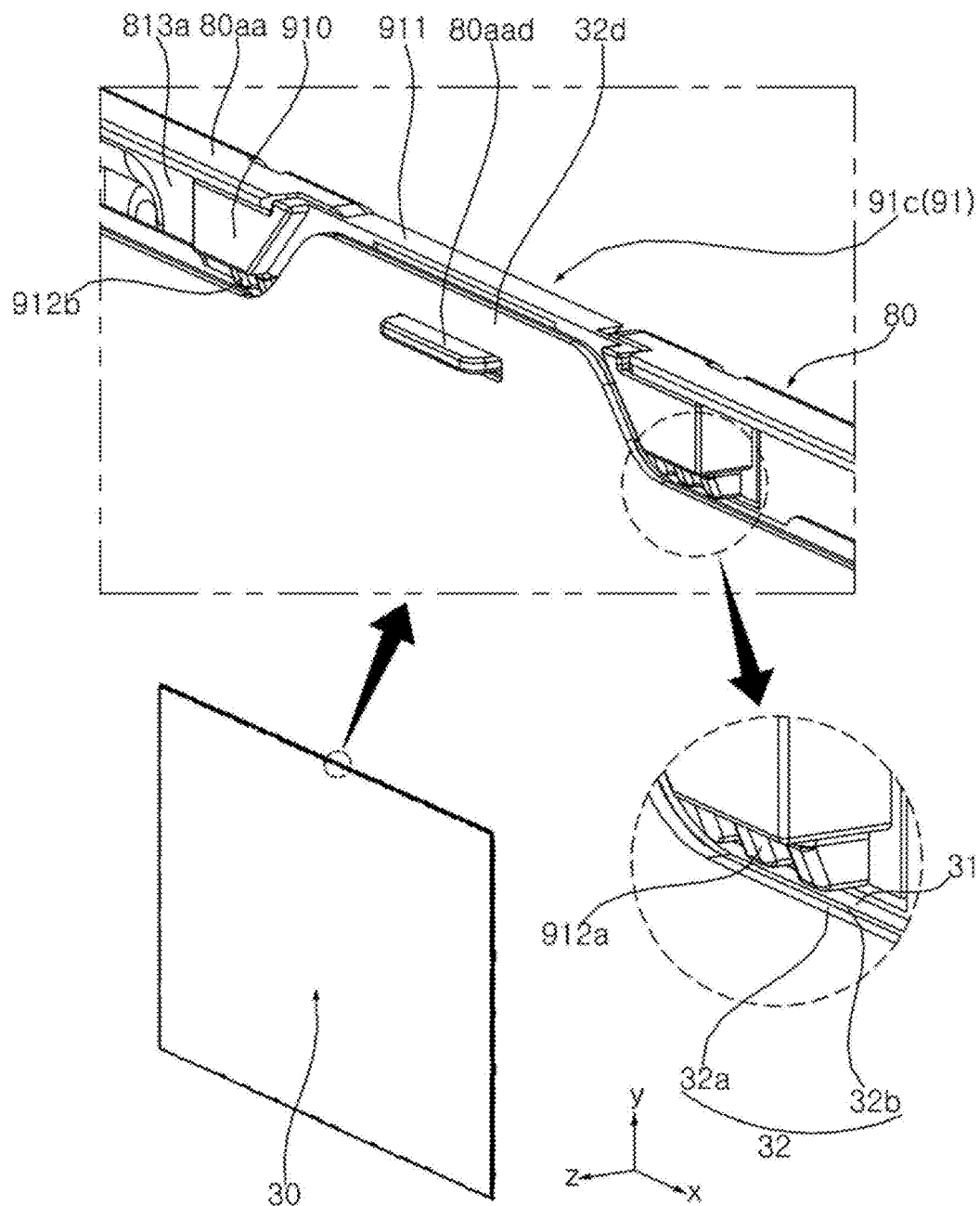

[FIG. 21]
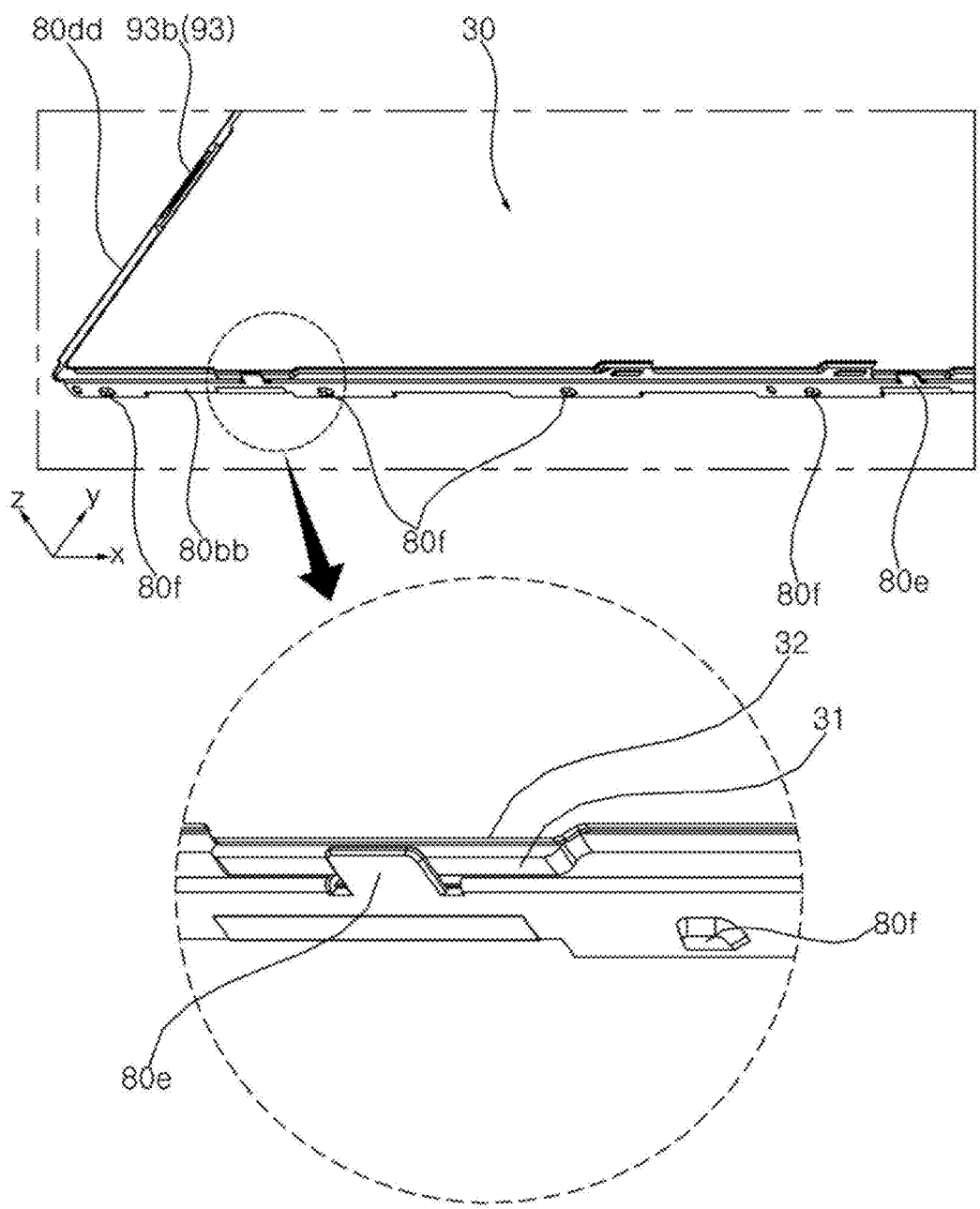

[FIG. 22]
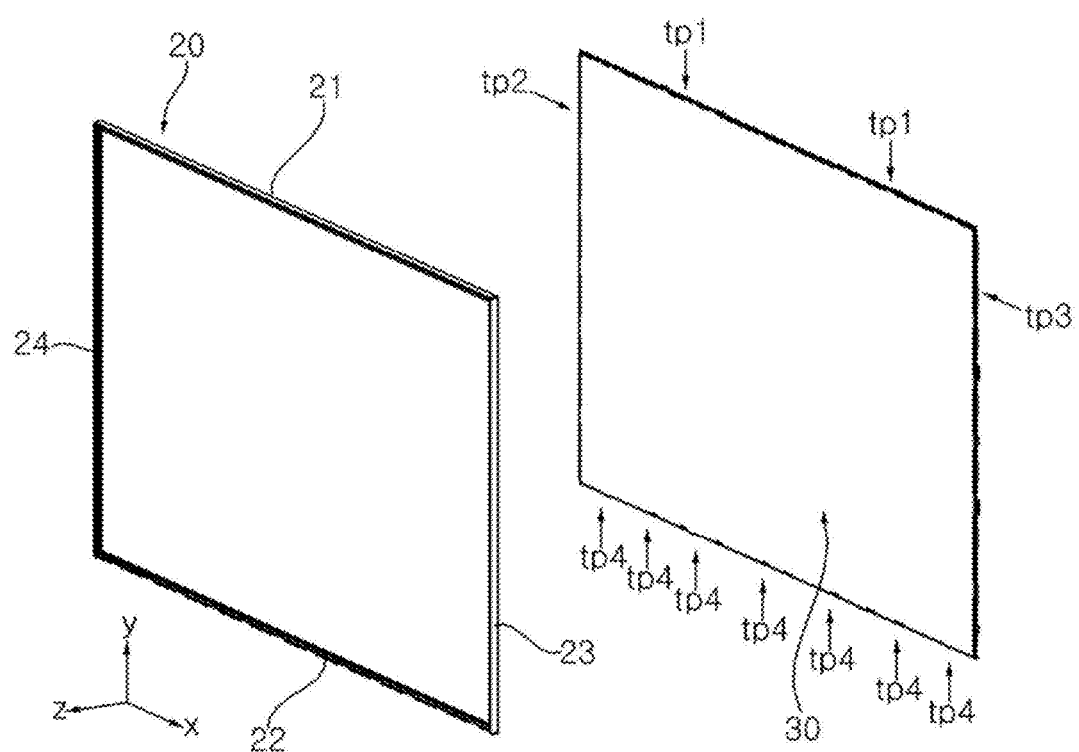

[FIG. 23]
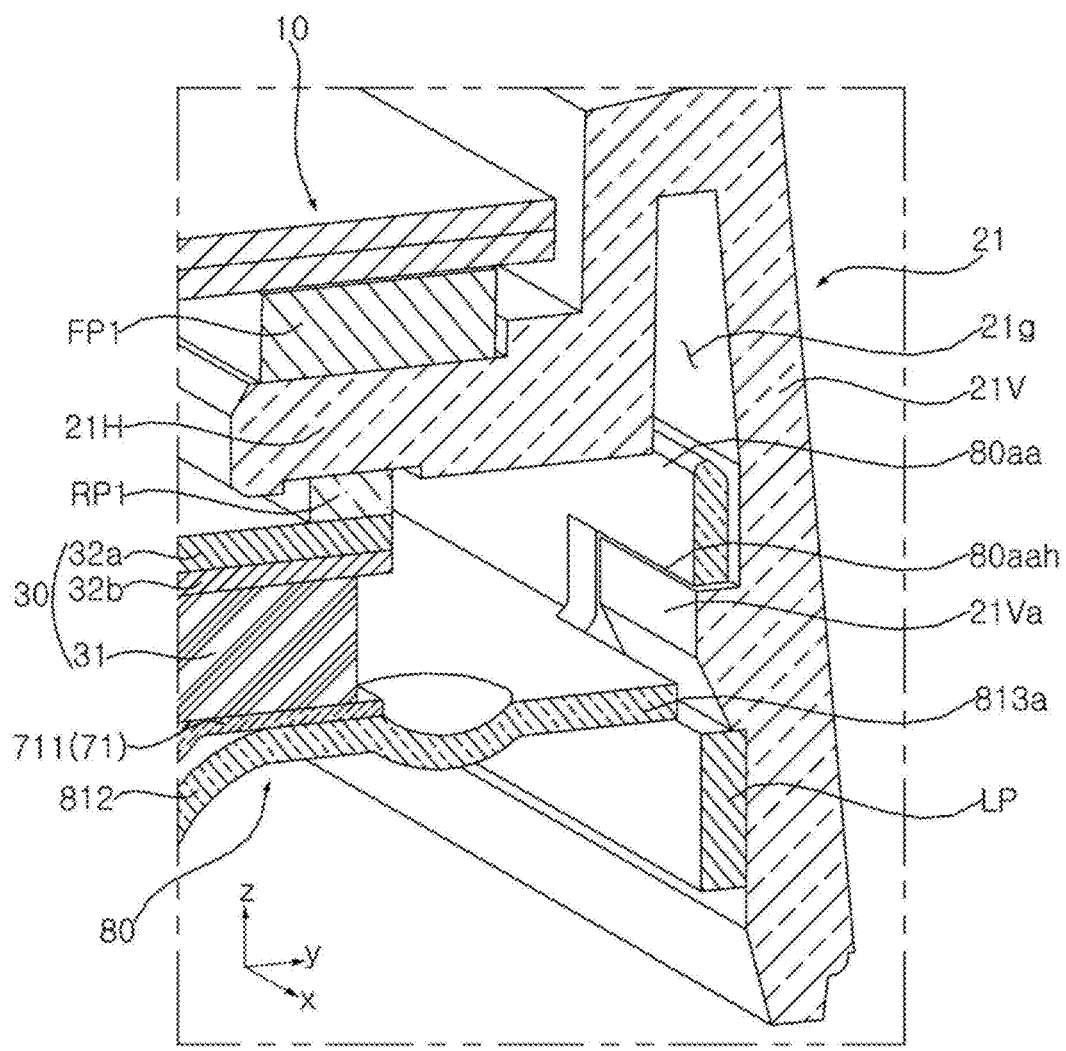

[FIG. 24]
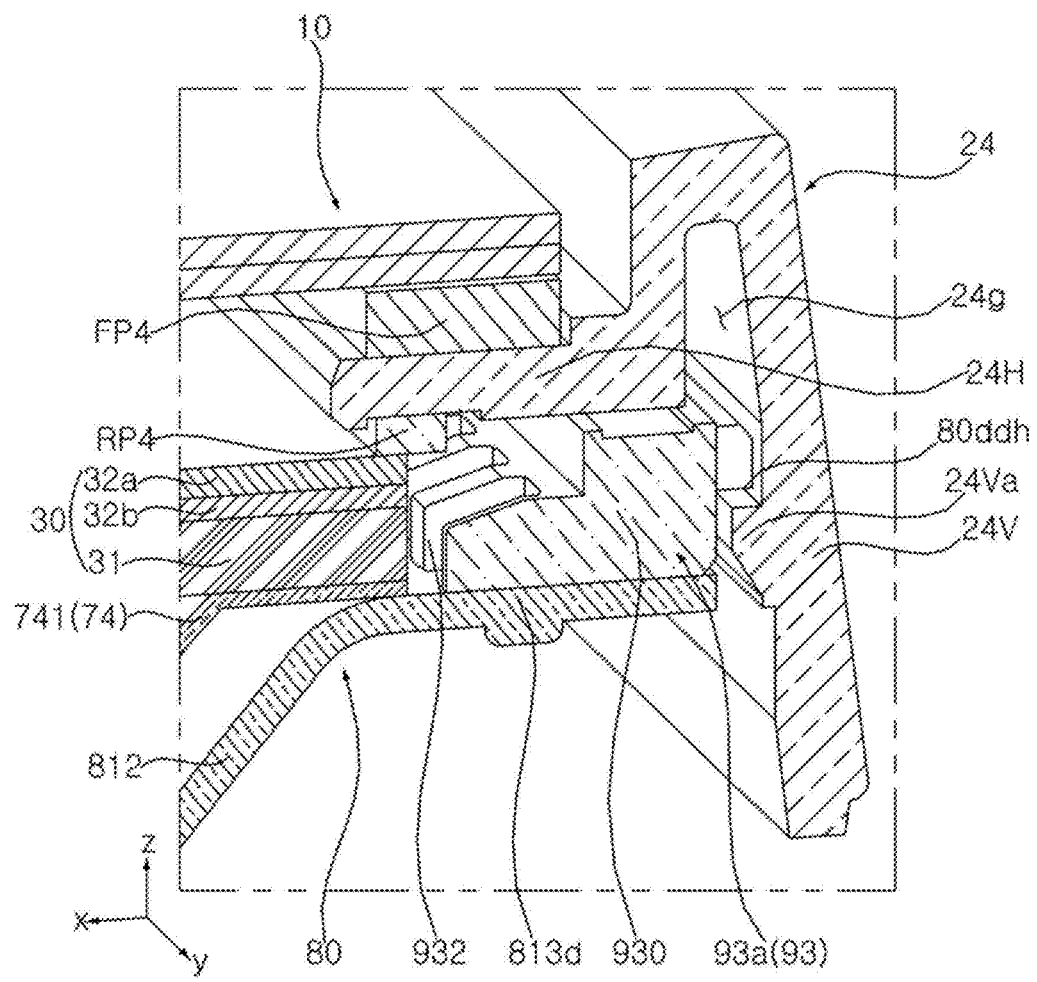

[FIG. 25]
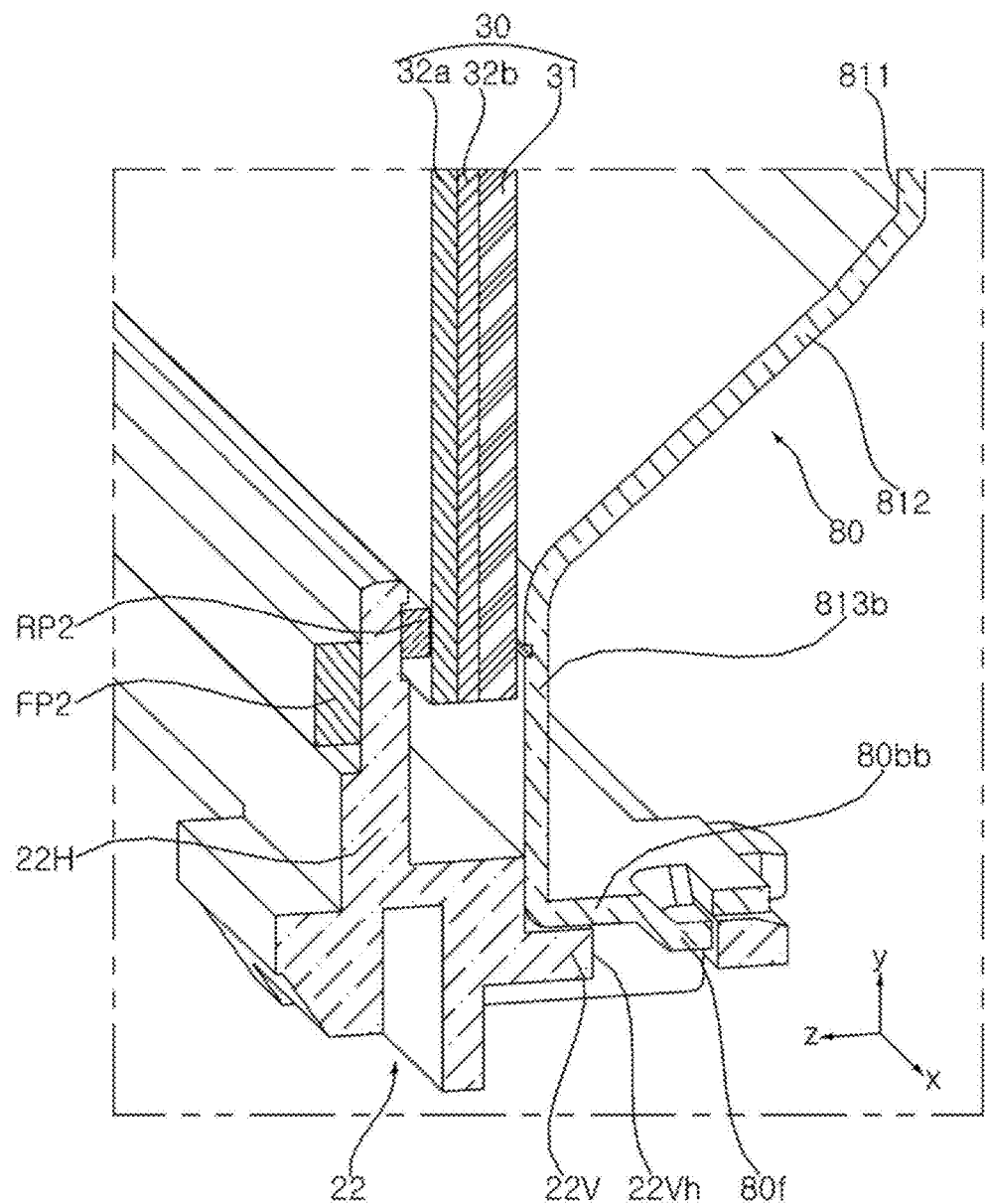

[FIG. 26]
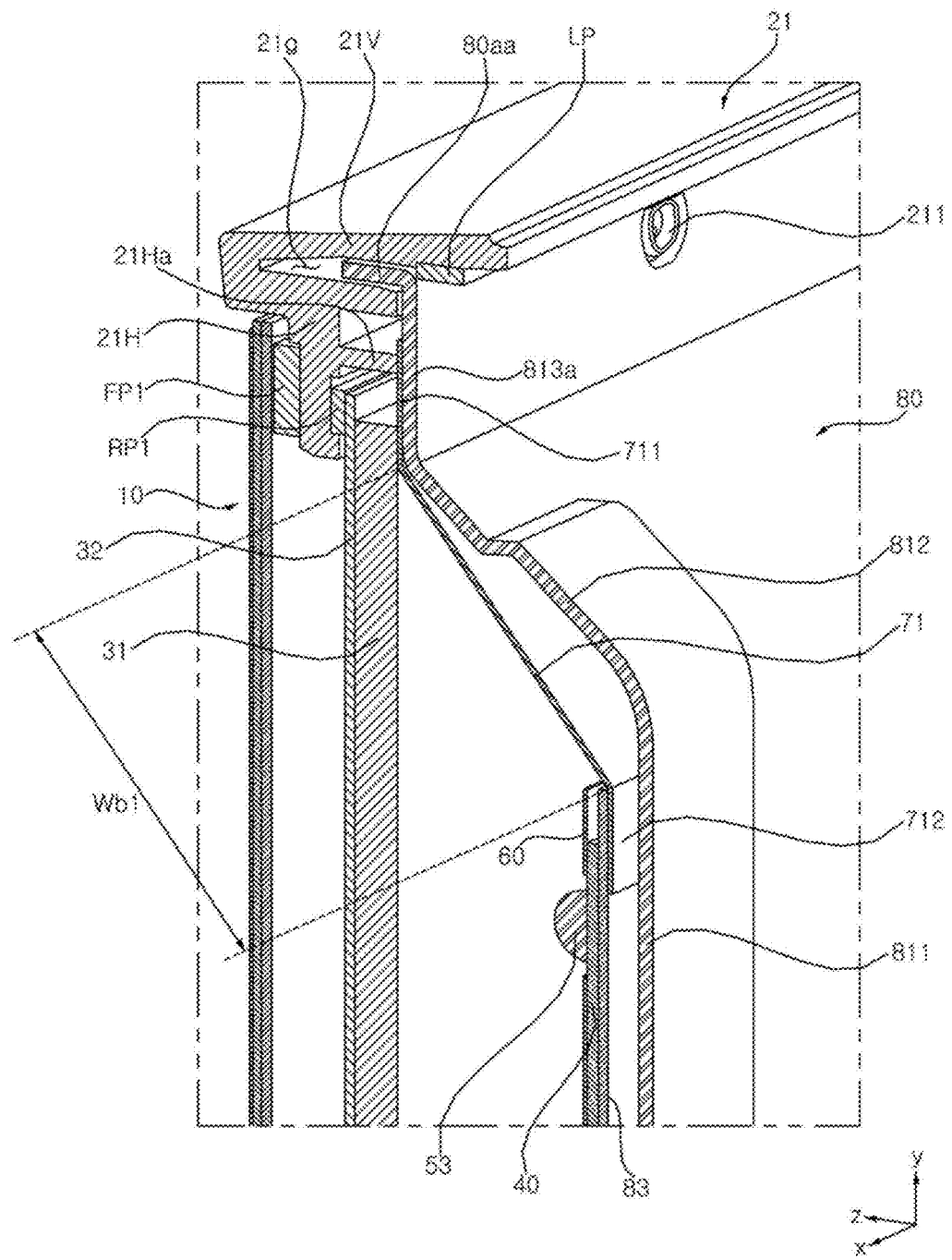

[FIG. 27]
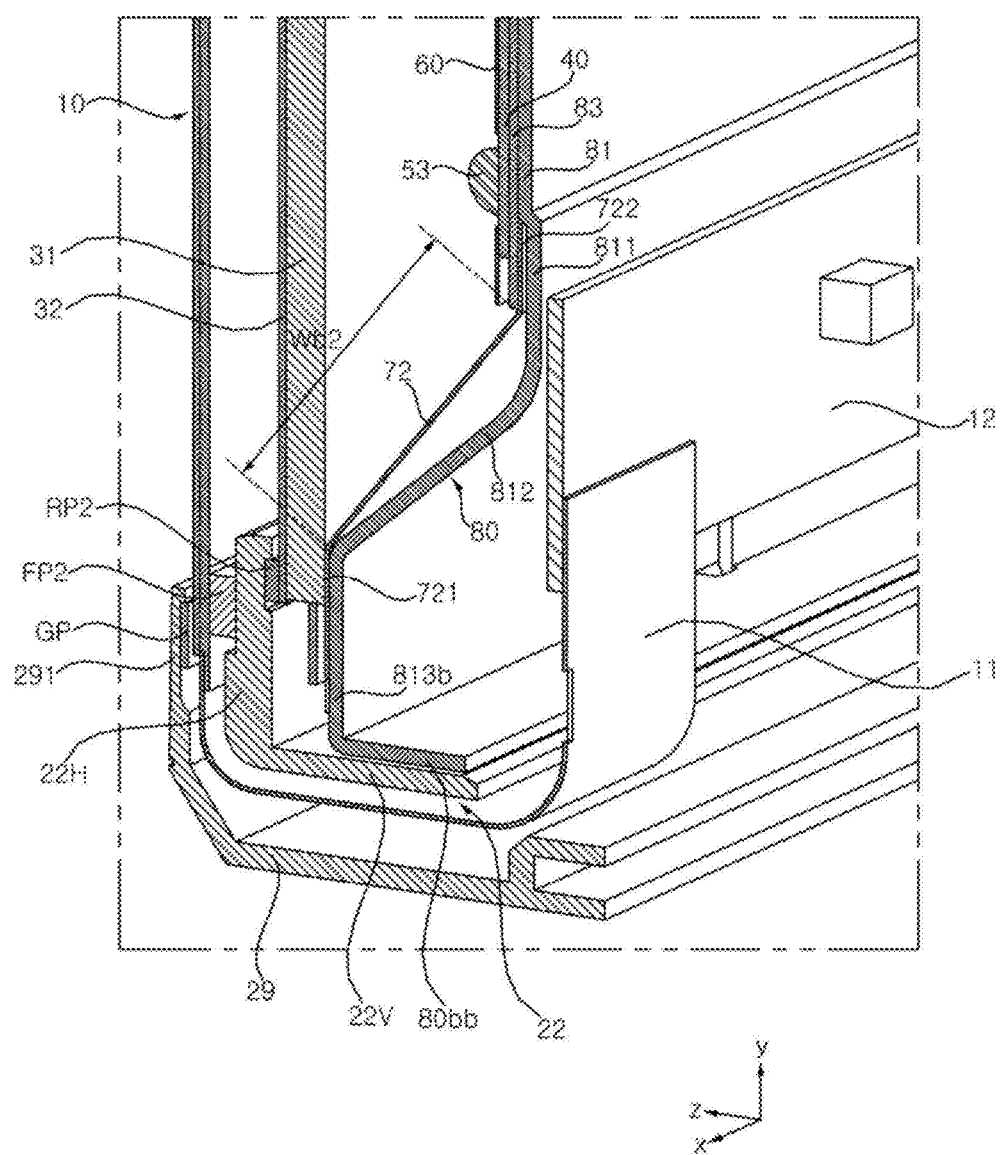

[FIG. 28]
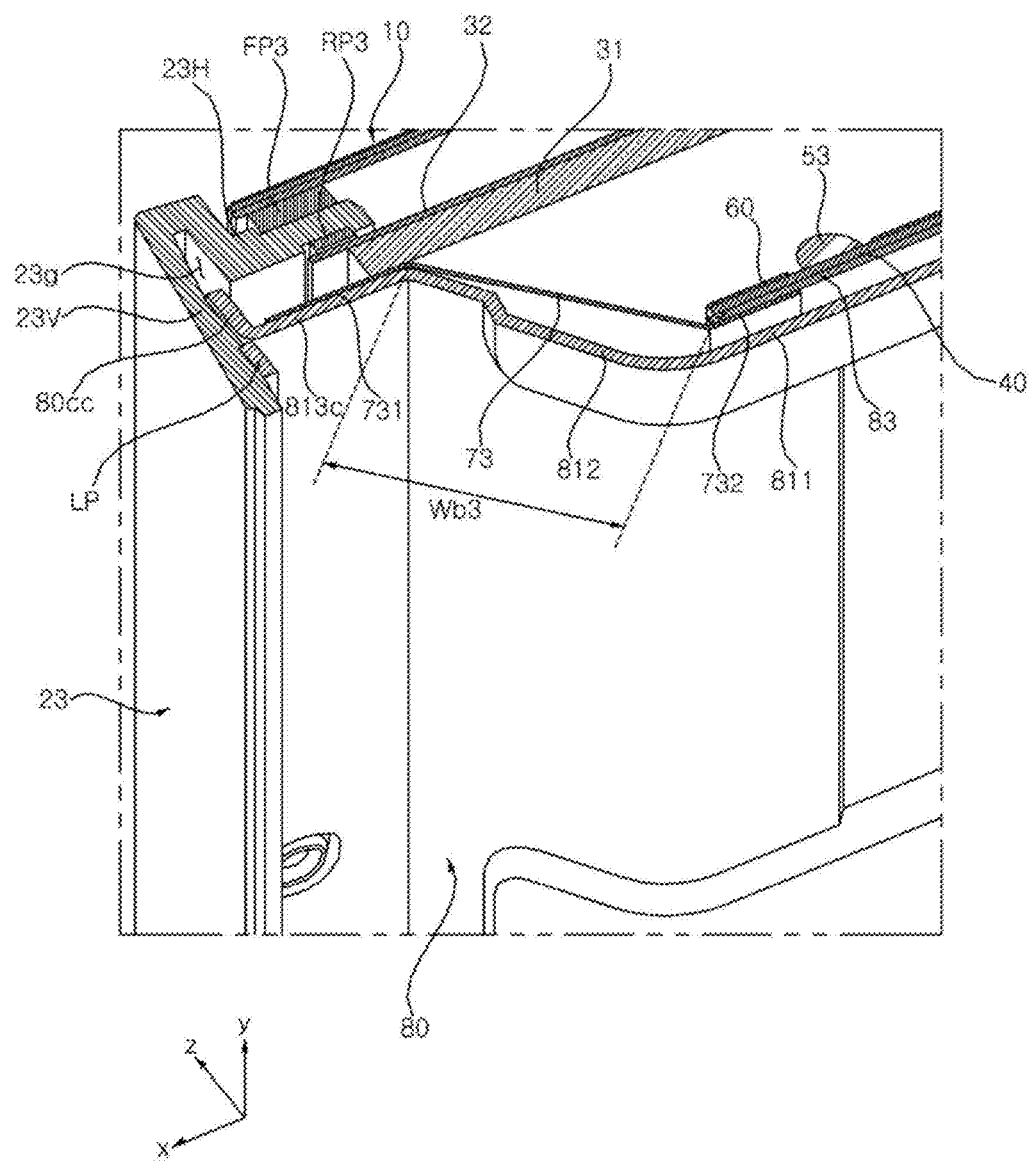

[FIG. 29]
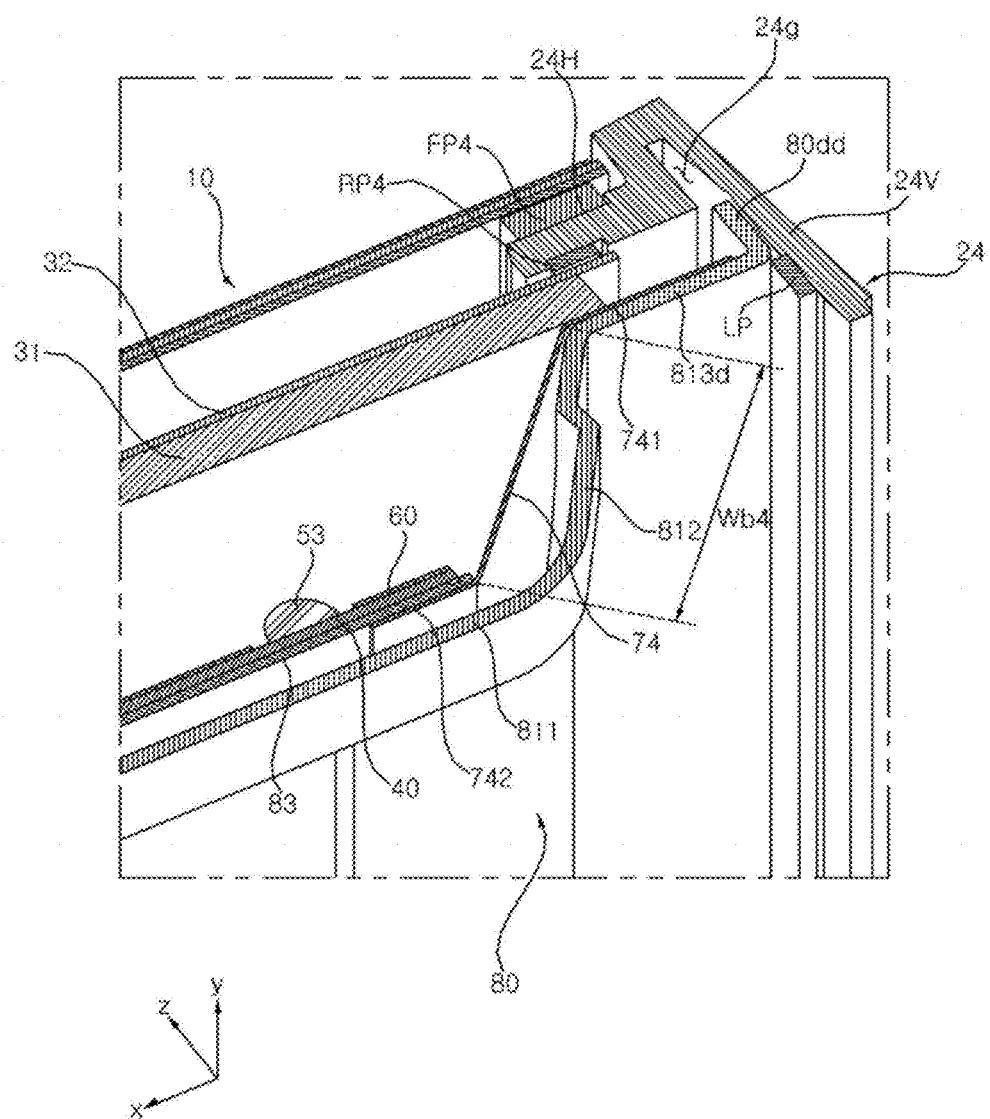

DISPLAY DEVICE

CROSS REFERENCE TO RELATED APPLICATIONS

This application is the National Phase of PCT/KR2022/000197 filed on Jan. 6, 2022, which is hereby expressly incorporated by reference into the present application.

FIELD

The present disclosure relates to a display device.

BACKGROUND ART

With the development of information society, there has been a growing demand for various types of display devices. In order to meet such demand, various display devices, such as a liquid crystal display (LCD), a plasma display panel (PDP), an electro luminescent display (ELD), a vacuum fluorescent display (VFD), an organic light emitting diode (OLED), and the like, have been developed and used.

Among them, an LCD panel includes a TFT substrate and a color substrate that are opposite each other with a liquid crystal layer interposed therebetween, so as to display an image using light provided from a backlight unit.

Recently, various research has been conducted on a structure that enables a slim bezel of a display device. In addition, numerous research has been conducted on a holder that prevents or suppresses the movement of a diffusion plate caused by thermal expansion or contraction.

SUMMARY

It is an objective of the present disclosure to solve the above and other problems.

Another object may be to provide a coupling structure between a holder of a diffusion plate (or a light guide plate) and a frame.

Another object may be to provide a structure that can improve the reliability of coupling between a frame and a holder that occupies a relatively small area.

Another object may be to provide a structure that can allow a holder to remain coupled to a frame regardless of external shock, a change in temperature, etc.

Another object may be to provide a structure that can reduce manufacturing cost by coupling a holder to a frame without using a separate member such as double-sided tape.

Another object may be to provide a structure that can minimize leakage of light from a diffusion plate to the outside.

Another object may be to provide a structure that can couple a guide panel with a frame and guide the coupling.

In accordance with an aspect of the present disclosure to achieve the above and other objectives, a display device may include: a display panel; a frame positioned behind the display panel; a light source providing light to the display panel; an optical plate positioned between the display panel and the light source; a frame which is opposite to the display panel with respect to the optical plate and on which the optical plate is seated; and a holder adjacent to one side of the optical plate and coupled onto the frame, the holder may include: a plurality of protrusions formed at one surface of the holder that faces the one side of the optical plate; and a coupling portion protruding from the holder toward the frame, passing through the frame, and engaged with a rear surface of the frame.

Effect of Invention

A display device according to the present disclosure has the following effects.

According to at least one of the embodiments of the present disclosure, it is possible to provide a coupling structure between a holder of a diffusion plate (or a light guide plate) and a frame.

According to at least one of the embodiments of the present disclosure, it is possible to provide a structure that improves the reliability of coupling between a frame and a holder that occupies a relatively small area.

According to at least one of the embodiments of the present disclosure, it is possible to provide a structure that allows a holder to remain coupled to a frame regardless of external shock, a change in temperature, etc.

According to at least one of the embodiments of the present disclosure, it is possible to provide a structure that allows a holder to be coupled to a frame without using a separate member such as double-sided tape, thereby reducing manufacturing cost.

According to at least one of the embodiments of the present disclosure, it is possible to provide a structure that minimizes leakage of light from a diffusion plate to the outside.

According to at least one of the embodiments of the present disclosure, it is possible to provide a structure that couples a guide panel with a frame and guides the coupling.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF THE DRAWINGS

FIGS. 1 to 4 are diagrams illustrating examples of a display device related to the present disclosure.

FIGS. 5 to 29 are diagrams illustrating examples of a display device according to embodiments of the present disclosure.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

It will be understood that the terms "comprises" and/or "has", when used in this specification, specify the presence of a stated feature, number, step, operation, component, element, or combination thereof, but do not preclude the presence or addition of one or more other features, numbers, steps, operations, components, elements, or combinations thereof.

Referring to FIG. 1, a display device 1 may include a display panel 10. The display panel 10 may display a screen.

The display device 1 may include a first long side LS1, a second long side LS2 opposite the first long side LS1, a first short side SS1 adjacent to the first long side LS1 and the second long side LS2, and a second short side SS2 opposite the first short side SS1. For ease of explanation, it is illustrated and described that lengths of the first and second long sides LS1 and LS2 are greater than lengths of the first and second short sides SS1 and SS2. However, the lengths of the first and second long sides LS1 and LS2 may be substantially equal to the lengths of the first and second short sides SS1 and SS2.

A direction parallel to the long sides LS1 and LS2 of the display device 1 may be referred to as a left-and-right direction. A direction parallel to the short sides SS1 and SS2 of the display device 1 may be referred to as an up-and-down direction. A direction perpendicular to the long sides LS1 and LS2 and the short sides SS1 and SS2 of the display device 1 may be referred to as a front-and-rear direction.

A direction in which the display panel 10 displays an image may be referred to as a front (F, z), and a direction opposite to the front may be referred to as a rear (R). The first long side LS1 may be referred to as an upper side (U, y). The second long side LS2 may be referred to as a lower side (D). The first short side SS1 may be referred to as a left side (Le, x). The second short side SS2 may be referred to as a right side (Ri).

The first long side LS1, the second long side LS2, the first short side SS1, and the second short side SS2 may be referred to as edges of the display device 1. In addition, points where the first long side LS1, the second long LS2, the first short side SS1, and the second short side SS2 meet one another may be referred to as corners.

For example, a point where the first short side SS1 and the first long side LS1 meet may be referred to as a first corner C1; a point where the first long side LS1 and the second short side SS2 meet may be referred to as a second corner C2; a point where the second short side SS2 and the second long side LS2 meet may be referred to as a third corner C3; and a point where the second long side LS2 and the first short side SS1 meet may be referred to as a fourth corner C4.

Referring to FIG. 2, the display device 1 may include a display panel 10, a front cover 15, a guide panel 20, a backlight unit 30, a frame 80, and a back cover 89.

The display panel 10 may define a front surface of the display device 1 and may display an image. The display panel 10 may display an image in such a manner that each of a plurality of pixels outputs red, green, or blue (RGB) light in accordance with timing. The display panel 10 may be divided into an active area in which an image is displayed and a de-active area in which no image is displayed. The display panel 10 may include a front substrate and a rear substrate that are disposed opposite each other with a liquid crystal layer interposed therebetween. The display panel 10 may be referred to as an LCD panel.

The front substrate may include a plurality of pixels, each of which consists of red, green, and blue subpixels. The front substrate may output light corresponding to red, green, or blue color according to a control signal.

The rear substrate may include switching elements. The rear substrate may switch a pixel electrode. For example, the pixel electrode may change the molecular arrangement of a liquid crystal layer in response to a control signal input from the outside. The liquid crystal layer may include liquid crystal molecules. The arrangement of liquid crystal molecules may be changed according to a voltage difference between the pixel electrode and a common electrode. The liquid crystal layer may transmit light from the backlight unit 30 to the front substrate or block the light.

The front cover 15 may cover a front surface and at least a portion of a side (or lateral) surface of the display panel 10. The front cover 15 may be divided into a front cover positioned at the front surface of the display panel 10 and a side cover positioned at the side surface of the display panel 10. The front cover and the side cover may be provided separately, or may be provided as one body. At least one of the front cover or the side cover may be omitted.

The guide panel 20 may surround the periphery of the display panel 10, and may cover the side surface of the display panel 10. The guide panel 20 may be coupled to the display panel 10 or support the display panel 10. The guide panel 20 may be referred to as a panel guide or a side frame.

The backlight unit 30 may be positioned at the rear of the display panel 10. The backlight unit 30 may include light sources. The backlight unit 30 may be coupled to the frame 80 at the front of the frame 80. The backlight unit 30 may be driven by a full driving scheme or a partial driving scheme such as local dimming or impulsive driving. The backlight unit 30 may include an optical sheet 32 and an optical plate 31.

The optical sheet 32 may allow light of the light source to be uniformly transmitted to the display panel 10. The optical sheet 32 may consist of a plurality of layers. For example, the optical sheet 32 may include a prism sheet, a diffusion sheet, or the like. Meanwhile, a sheet coupling portion 32d of the optical sheet 32 may be coupled to the front cover 15, the frame 80, or the back cover 89.

The frame 80 may be positioned at the rear of the backlight unit 30, and may support components of the display device 1. For example, components such as the backlight unit 30 and a printed circuit board (PCB) on which a plurality of electronic components are positioned may be coupled to the frame 80. The frame 80 may include a metal material such as an as aluminum alloy. The frame 80 may be referred to as a main frame or a module cover.

The back cover 89 may cover the rear of the frame 80, and may be coupled to the frame 80 and/or the front cover 15. For example, the back cover 89 may be an injection-molded part made of resin. As another example, the back cover 89 may include a metal material.

Referring to FIG. 3, a substrate 40, at least one light assembly 51, and a reflective sheet 60 may be positioned at the rear of the optical plate 31. The optical sheet 32 may be positioned at the front of the optical plate 31. The optical plate 31 may be referred to as a diffusion plate 31.

The substrate 40 may be configured as a plurality of straps extending in the left-and-right direction and spaced apart from each other in the up-and down direction. At least one light assembly 51 may be mounted on the substrate 40. An electrode pattern may be formed on the substrate 40 so as to connect an adaptor to the light assembly 51. For example, the electrode pattern may be a carbon nanotube (CNT) electrode pattern. The substrate 40 may be made of at least one of polyethylene terephthalate (PET), glass, polycarbonate (PC), or silicon. The substrate 40 may be a printed circuit board (PCB) on which at least one light assembly 51 is mounted.

The light assembly 51 may be a light emitting diode (LED) chip or an LED package including at least one LED chip. The light assembly 51 may be configured as a colored LED emitting at least one of red, green, and blue light, or a white LED. The colored LED may include at least one of a red LED, a green LED, or a blue LED.

The reflective sheet 60 may be positioned at the front of the substrate 40. At least one hole 60a may be formed through the reflective sheet 60, and the light assembly 51 may be positioned in the hole 60a. The reflective sheet 60 may reflect light, which is provided by the light assembly 51 or reflected by the diffusion plate 31, forward. For example, the reflective sheet 60 may include a metal and/or a metal oxide having a high reflectance such as at least one of aluminum (Al), silver (Ag), gold (Au), or titanium dioxide (TiO2).

An air gap may be formed between the reflective sheet 60 and the diffusion plate 31. The air gap may serve as a buffer, and may allow the light provided by the light assembly 51 to spread widely. A supporter 39 may be positioned between the reflective sheet 60 and the diffusion plate 31 to thereby define the air gap.

The diffusion plate 31 may be positioned at the front of the reflective sheet 60. The diffusion plate 31 may be positioned between the reflective sheet 60 and the optical sheet 32.

The optical sheet 32 may include at least one sheet. For example, the optical sheet 32 may include one or more prism sheets and/or one or more diffusion sheets. The plurality of sheets of the optical sheet 32 may be attached to each other or in close contact with each other.

In detail, the optical sheet 32 may include a plurality of sheets having different functions. For example, the optical sheet 32 may include a first optical sheet 32a, a second optical sheet 32b, and a third optical sheet 32c. For example, the first optical sheet 32a may be a diffusion sheet, and the second optical sheet 32b and the third optical sheet 32c may be a prism sheet. The diffusion sheet may prevent light emitted from the diffusion plate 31 from being partially concentrated, thereby achieving more uniform distribution of light. The prism sheet may collect or condense light from the diffusion sheet 31 and provide the light to the display panel 10. The number and/or position of the diffusion sheet and the prism sheet may vary.

Referring to FIG. 4, a substrate 40', at least one light assembly 51', a reflective sheet 60', and an optical plate 33 may be positioned at the rear of the diffusion plate 31. The optical sheet 32 may be positioned at the front of the diffusion plate 31.

The substrate 40' may extend in the left-and-right direction, and may be adjacent to the periphery of the optical plate 33. For example, the substrate 40' may be adjacent to a lower side of the optical plate 33. At least one light assembly 51' may be mounted on the substrate 40'. An electrode pattern may be formed on the substrate 40' so as to connect an adaptor to the light assembly 51'. For example, the electrode pattern may be a carbon nanotube (CNT) electrode pattern. The substrate 40' may be made of at least one of polyethylene terephthalate (PET), glass, polycarbonate (PC), or silicon. The substrate 40' may be a printed circuit board (PCB) on which at least one light assembly 51' is mounted.

The light assembly 51' may be a light emitting diode (LED) chip or an LED package including at least one LED chip. The light assembly 51' may be configured as a colored LED emitting at least one of red, green, and blue light, or a white LED. The colored LED may include at least one of a red LED, a green LED, or a blue LED.

The optical plate 33 may be positioned at the rear of the optical sheet 32. Most of the light provided by the light assembly 51' may be transmitted into the optical plate 33. The optical plate 33 may reflect the light forward from the light assembly 51'. The optical plate 33 may be referred to as a light guide plate 33.

The reflective sheet 60' may be positioned at the rear of the light guide plate 33. The reflective sheet 60' may reflect light, which is provided by the light assembly 51' or reflected by the light guide plate 33, forward. For example, the reflective sheet 60' may include a metal and/or a metal oxide having a high reflectance such as at least one of aluminum (Al), silver (Ag), gold (Au), or titanium dioxide (TiO2). Meanwhile, the diffusion plate 31 between the light guide plate 33 and the optical sheet 32 may be omitted.

Referring to FIGS. 5 and 6, a display device may include a display panel 10, a side frame 20, a backlight unit 30, a frame 80, and a back cover 89.

The display panel 10 may define a front surface of the display device, and may display an image. The display panel 10 may display an image in such a manner that each of a plurality of pixels outputs red, green, or blue (RGB) light in accordance with timing. The display panel 10 may be divided into an active area in which an image is displayed and a de-active area in which no image is displayed. The display panel 10 may include a front substrate and a rear substrate that are opposite each other with a liquid crystal layer interposed therebetween. The display panel 10 may be referred to as an LCD panel.

The front substrate may include a plurality of pixels, each of which consists of red, green, and blue subpixels. The front substrate may output light corresponding to red, green, or blue color according to a control signal.

The rear substrate may include switching elements. The rear substrate may switch a pixel electrode. For example, the pixel electrode may change the molecular arrangement of a liquid crystal layer in response to a control signal input from the outside. The liquid crystal layer may include liquid crystal molecules. The arrangement of liquid crystal molecules may be changed according to a voltage difference between the pixel electrode and a common electrode. The liquid crystal layer may transmit light from the backlight unit 30 to the front substrate or block the light.

The side frame 20 may extend along the periphery of the display panel 10, and may cover a side (or lateral) surface of the display panel 10. The side frame 20 may be coupled to the display panel 10, and may support the display panel 10. The side frame 20 may be referred to as a guide panel 20.

The backlight unit 30 may be positioned at the rear of the display panel 10. The backlight unit 30 may be coupled to the frame 80 at the front of the frame 80. The backlight unit 30 may be driven by a full driving scheme or a partial driving scheme such as local dimming or impulsive driving. The backlight unit 30 may include light sources 51 configured to emit light forward, a substrate 40 on which the light sources 51 are mounted, lenses 53 covering the light sources 51, a reflective sheet 60 covering a front surface of the substrate 40, an optical plate 31 positioned at the front of the reflective sheet 60, and an optical sheet 32 positioned at the front of the optical plate 31.

The light source 51 may be a light emitting diode (LED) chip or an LED package including at least one LED chip. For example, the light source 51 may be a colored LED emitting at least one of red, green, and blue light, or a white LED. For example, the light source 51 may be a mini-LED. A power supply (not shown) of the display device may provide power to the light source 51 through the substrate 40.

A plurality of lenses 53 may cover a plurality of light sources 51, respectively. An accommodating portion (no reference numeral) may be formed in a lower surface of the lens 53, and may surround the light source 51. A dome portion (no reference numeral) may define an upper surface of the lens 53, and may have a substantially hemispherical shape. The lens 53 may include at least one of silicone, polymethyl methacrylate (PMMA), or polycarbonate (PC). Light provided by the light source 51 may be refracted or reflected by the lens 53 to spread over a wider beam angle than the light source 51.

The reflective sheet 60 may include at least one of a metal and a metal oxide. For example, the reflective sheet 60 may include a metal and/or a metal oxide having a high reflectance such as at least one of aluminum (Al), silver (Ag), gold (Au), or titanium dioxide (TiO2). For example, resin may be deposited on or applied to the reflective sheet 60 so as to diffuse light of the light source 51.

The optical plate 31 may be disposed opposite the display panel 10 with respect to the side frame 20. The optical plate 31 may allow light of the light source 51 to be uniformly transmitted to the display panel 10. The optical plate 31 may be referred to as a diffusion plate 31. Alternatively, instead of the optical plate 31, the optical plate 33 described above with reference to FIG. 4 may be disposed opposite the display panel 10 with respect to the side frame 20. In this case, instead of the light source 51, the light source 51' described above with reference to FIG. 4 may provide light to one side of the optical plate 33, and the reflective sheet 60' may be positioned at a rear surface of the optical plate 33. The optical plate 33 may be referred to as a light guide plate 33. In the following, for the sake of brevity, a holder (91, 92, 93) will be described with respect to the diffusion plate 31. However, the description of the diffusion plate 31 and the holder (91, 92, 93) is equally applicable to the light guide plate 33 and the holder (91, 92, 93). In other words, the holder (91, 92, 93) may prevent or suppress movement of the diffusion plate 31 or the light guide plate 33.

The diffusion plate 31 may be positioned between the reflective sheet 60 and the optical sheet 32. The diffusion plate 31 may diffuse light of the light source 51. In addition, an air gap may be formed between the reflective sheet 60 and the diffusion plate 31. The air gap may serve as a buffer, and may allow the light of the light source 51 to spread widely.

A supporter 39 may be positioned between the reflective sheet 60 and the diffusion plate 31, so that a first side thereof may be coupled to the reflective sheet 60 and a second side thereof may support the diffusion plate 31. The supporter 39 may be referred to as a spacer.

The optical sheet 32 may be adjacent to or in contact with a front surface of the diffusion plate 31. The optical sheet 32 may include at least one sheet. For example, the optical sheet 32 may include a plurality of sheets having different functions, and the plurality of sheets may be attached to each other or in close contact with each other. For example, a first optical sheet 32a may be a diffusion sheet, and a second optical sheet 32b may be a prism sheet. The diffusion sheet may prevent light from the diffusion plate 31 from being partially concentrated, thereby achieving uniform distribution of light. The prism sheet may collect or condense light from the diffusion sheet and provide the light to the display panel 10. Here, the number and/or position of the diffusion sheet and the prism sheet may vary.

For example, the optical sheet 32 may change the wavelength or color of light emitted from the light source 51. For example, the optical sheet 32 may include a red-based phosphor and/or a green-based phosphor. In this case, the light source 51 may provide blue-based light, and the optical sheet 32 may convert the blue light of the light source 51 to white light. The optical sheet 32 may be referred to as a quantum dot (QD) sheet.

The frame 80 may be positioned at the rear of the backlight unit 30. The display panel 10, the side frame 20, and the backlight unit 30 may be coupled to the frame 80. The frame 80 may support the components of the display device described above and below. For example, the frame 80 may include a metal material such as an as aluminum alloy. The frame 80 may be referred to as a main frame, a module cover, or a cover bottom.

The back cover 89 may cover the rear of the frame 80, and may be coupled to the frame 80. For example, the back cover 89 may be an injection-molded part made of resin. As another example, the back cover 89 may include a metal material.

Referring to FIG. 7, the frame 80 may have a generally rectangular flat plate shape. A plurality of holders 91, 92, and 93 may be adjacent to an edge of the frame 80, and may be detachably coupled to a front surface of the frame 80. The plurality of holders 91, 92, and 93 may include a resin or silicone material.

An upper holder 91 may be adjacent to an upper side 80U of the frame 80, and may be detachably coupled to the front surface of the frame 80. A plurality of upper holders 91a, 91b, 91c, 91d, and 91e may be spaced apart from each other along the upper side 80U of the frame 80. For example, five upper holders 91a, 91b, 91c, 91d, and 91e may be provided. A first upper holder 91a may be adjacent to a corner where the upper side 80U and a left side 80L of the frame 80 meet, and a fifth upper holder 91e may be adjacent to a corner where the upper side 80U and a right side 80R of the frame 80 meet. A second upper holder 91b, a third upper holder 91c, and a fourth upper holder 91d may be positioned between the first upper holder 91a and the fifth upper holder 91e. For example, the plurality of upper holders 91a, 91b, 91c, 91d, and 91e may have the same shape.

A left holder 92 may be adjacent to the left side 80L of the frame 80, and may be detachably coupled to the front surface of the frame 80. A plurality of left holders 92a and 92b may be spaced apart from each other along the left side 80L of the frame 80. For example, two left holders 92a and 92b may be provided. A first left holder 92a may be adjacent to the corner where the upper side 80U and the left side 80L of the frame 80 meet, and a second left holder 92b may be adjacent to a corner where a lower side 80D and the left side 80L of the frame 80 meet. For example, the plurality of left holders 92a and 92b may have the same shape.

A right holder 93 may be adjacent to the right side 80R of the frame 80, and may be detachably coupled to the front surface of the frame 80. A plurality of right holders 93a and 93b may be spaced apart from each other along the right side 80R of the frame 80. For example, two right holders 93a and 93b may be provided. A first right holder 93a may be adjacent to the corner where the upper side 80U and the right side 80R of the frame 80 meet, and a second right holder 93b may be adjacent to a corner where the lower side 80D and the right side 80R of the frame 80 meet. For example, the plurality of right holders 93a and 93b may have the same shape.

As another example, the left holder 92 and the right holder 93 may be left-right symmetric with respect to a vertical line passing through a center of the frame 80.

Referring to FIG. 8, the frame 80 may include a pressed portion 811, an inclined portion 812, an upper support portion 813a, and an upper bending portion 80aa. The pressed portion 811 may be formed by being pressed rearward from the front surface of the frame 80. The inclined portion 812 may be bent obliquely forward from an upper side of the pressed portion 811. The upper support portion 813a may be bent upward from the inclined portion 812. The upper bending portion 80aa may be bent forward from the upper support portion 813a. The upper bending portion 80aa may be referred to as an upper rib or an upper wall.

An insertion portion 80aag may be formed by being recessed downward from an upper surface of the upper bending portion 80aa. The insertion portion 80aag may be a groove of an inverted trapezoidal shape. A front end 80aat of the insertion portion 80aag may form a step ga with respect to a front end of the upper bending portion 80aa.

An upper hole 813a1, 813a2 may be formed through the upper support portion 813a in the front-and-rear direction. A portion of the upper hole 813a1, 813a2 may be formed through the upper bending portion 80aa in the up-and-down direction. A first upper hole 813a1 may be disposed opposite a second upper hole 813a2 with respect to the insertion portion 80aag. The first upper hole 813a1 and the second upper hole 813a2 may have the same shape, namely, an oval shape. In this case, an upper coupling portion 913a, 913b, which will be described below, may have a head made of an elastic material to allow the head to pass through the upper hole 813a1, 813a2 having a smaller diameter than the head.

A protruding portion 80aad may protrude forward from the front end 80aat of the insertion portion 80aag. The protruding portion 80aad may be positioned at a central portion of the insertion portion 80aag.

The upper holder 91 may be positioned at the front of the frame 80. The upper holder 91 may include an upper body 910, a middle part 911, upper protrusions 912a, 912b, and the upper coupling portion 913a, 913b. For example, the upper body 910, the middle part 911, the upper protrusions 912a, 912b, and the upper coupling portion 913a, 913b may be formed as one body. The upper holder 91 may have elasticity.

The upper body 910 may be elongated in the left-and-right direction. The upper body 910 may have a generally cuboid shape that is horizontally long.

The middle part 911 may be formed at a central portion of the upper body 910. An insertion groove 911g may be positioned between the middle part 911 and the upper body 910, and may be formed along the insertion portion 80aag (see Ua). The insertion groove 911g may be aligned with the front end 80aat of the insertion portion 80aag. A portion under a central portion of the middle part 911 of the upper body 910 may be cut out. The cut-out portion may be aligned with the protruding portion 80aad in the front-and-rear direction. A first end 911a of the middle part 911 may be adjacent to a left end of the upper body 910, and may protrude upward from an upper surface of the upper body 910. A second end 911b of the middle part 911 may be adjacent to a right end of the upper body 910, and may protrude upward from the upper surface of the upper body 910.

A plurality of upper protrusions 912a, 912b may be formed on a lower surface of the upper body 910. The plurality of upper protrusions 912a, 912b may be formed at regular intervals, and may have a generally comb shape. First upper protrusions 912a may be disposed opposite second upper protrusions 912b with respect to the cut-out portion.

The upper coupling portion 913a, 913b may protrude rearward from a rear surface of the upper body 910. A first upper coupling portion 913a may be adjacent to the left end of the upper body 910, and may be aligned with the first upper hole 813a1. A second upper coupling portion 913b may be adjacent to the right end of the upper body 910, and may be aligned with the second upper hole 813a2. Each of the first upper coupling portion 913a and the second upper coupling portion 913b may include a neck protruding from the upper body 910 and a head connected to the neck. A diameter of the head may be greater than a diameter of the neck. The upper hole 813a1, 813a2 may have a diameter equal or similar to the diameter of the neck and less than the diameter of the head. For example, the diameter of the head may be 0.6 to 0.8 mm greater than the diameter of the upper hole 813a1, 813a2. For example, the sum of lengths of the neck and the head may be 0.3 to 0.4 mm greater than a thickness of the upper support portion 813a.

Referring to FIG. 9, an upper hole 813a1, 813a2 may be formed through the upper support portion 813a in the front-and-rear direction. The upper hole 813a1, 813a2 may be offset from the upper bending portion 80aa. A first upper hole 813a1 may be disposed opposite a second upper hole 813a2 with respect to the insertion portion 80aag. The first upper hole 813a1 and the second upper hole 813a2 may have the same shape, namely, an oval shape. In this case, the head of the upper coupling portion 913a, 913b that is made of an elastic material may pass through the upper hole 813a1, 813a2 having a smaller diameter than the head.

Referring to FIGS. 10 and 11, the upper body 910 may be seated on the upper support portion 813a. The middle part 911 may be seated on the insertion portion 80aag. The insertion portion 80aag may be inserted into the insertion groove 911g (see FIGS. 8 and 9).

The first end 911a of the middle part 911 may be positioned in a step between the upper bending portion 80aa and the insertion portion 80aag, and leftward and rearward movement of the middle part 911 may be limited by the upper bending portion 80aa and the insertion portion 80aag. The second end 911b of the middle part 911 may be positioned in the step between the upper bending portion 80aa and the insertion portion 80aag, and rightward and rearward movement of the middle part 911 may be limited by the upper bending portion 80aa and the insertion portion 80aag.

The upper surface of the upper body 910 may be in contact with an inner surface of the upper bending portion 80aa. In addition, a portion that defines the insertion groove 911g (see FIGS. 8 and 9) of the upper body 910 may be in contact with an inner surface of the insertion portion 80aag. Thus, the upper bending portion 80aa and the insertion portion 80aag may limit or restrict upward movement of the upper holder 91.

The upper coupling portion 913a, 913b may be inserted into and coupled to the upper hole 813a1, 813a2 (see FIGS. 8 and 9). In detail, the neck of the upper coupling portion 913a, 913b may pass through the upper hole 813a1, 813a2, and the head of the upper coupling portion 913a, 913b may be engaged with a rear surface of the upper support portion 813a. Thus, the coupling structure between the upper coupling portion 913a, 913b and the upper hole 813a1, 813a2 may limit or restrict the left and right movement and back and forth movement of the upper holder 91.

Meanwhile, a front surface of the middle part 911 may be lowered rearward from a front surface of the upper body 91 to thereby form a step. The protruding portion 80aad may be positioned between the first upper protrusions 912a and the second upper protrusions 912b, and may support a lower side of the upper holder 91.

Referring to FIG. 12, the frame 80 may include a pressed portion 811, an inclined portion 812, a right support portion 813d, and a right bending portion 80dd. The pressed portion 811 may be formed by being pressed rearward from the front surface of the frame 80. The inclined portion 812 may be bent obliquely forward from a right side of the pressed portion 811. The right support portion 813d may be bent rightward from the inclined portion 812. The right bending portion 80dd may be bent forward from the right support portion 813d. The right bending portion 80dd may be referred to as a right rib or a right wall.

A right hole 813d1, 813d2 may be formed through the right support portion 813d in the front-and-rear direction. For example, a portion of the right hole 813d1, 813d2 may be formed through the right bending portion 80dd in the left-and-right direction. As another example, the right hole 813d1, 813d2 may be offset from the right bending portion 80dd. A first right hole 813d1 and a second right hole 813d2 may be spaced apart from each other in the up-and-down direction. The first right hole 813d1 and the second right hole 813d2 may have the same shape, namely, an oval shape. In this case, a right coupling portion 933a, 933b, which will be described below; may have a head made of an elastic material to allow the head to pass through the right hole 813d1, 813d2 having a smaller diameter than the head.

The right holder 93 may be positioned at the front of the frame 80. The right holder 93 may include a right body 930, right protrusions 932, and the right coupling portion 933a, 933b. For example, the right body 930, the right protrusions 932, and the right coupling portion 933a, 933b may be formed as one body. The right holder 93 may have elasticity.

The right body 930 may be elongated in the up-and-down direction. The right body 930 may have a generally cuboid shape that is vertically long.

A plurality of right protrusions 932 may be formed on a left surface of the right body 930. The plurality of right protrusions 932 may be formed at regular intervals, and may have a generally comb shape.

The right coupling portion 933a, 933b may protrude rearward from a rear surface of the right body 930. A first right coupling portion 933a may be adjacent to an upper end of the right body 930, and may be aligned with the first right hole 813d1. A second right coupling portion 933b may be adjacent to a lower end of the right body 930, and may be aligned with the second right hole 813d2. Each of the first right coupling portion 933a and the second right coupling portion 933b may include a neck protruding from the right body 930 and a head connected to the neck. A diameter of the head may be greater than a diameter of the neck. The right hole 813d1, 813d2 may have a diameter equal or similar to the diameter of the neck and less than the diameter of the head. For example, the diameter of the head may be 0.6 to 0.8 mm greater than the diameter of the right hole 813d1, 813d2. For example, the sum of lengths of the neck and the head may be 0.3 to 0.4 mm greater than a thickness of the right support portion 813d.

Referring to FIGS. 13 and 14, the right body 930 may be seated on the right support portion 813d. A right surface of the right body 930 may be in contact with an inner surface of the right bending portion 80dd. Thus, the right bending portion 80dd may limit or restrict rightward movement of the right holder 93.

The right coupling portion 933a, 933b may be inserted into and coupled to the right hole 813d1, 813d2 (see FIG. 12). In detail, the neck of the right coupling portion 933a, 933b may pass through the right hole 813d1, 813d2, and the head of the right coupling portion 933a, 933b may be engaged with a rear surface of the right support portion 813d. Thus, the coupling structure between the right coupling portion 933a, 933b and the right hole 813d1, 813d2 may limit or restrict the up and down movement and back and forth movement of the right holder 93.

The above description of the right holder 93 is equally applicable to the first right holder 93a and the second right holder 93b.

Referring to FIG. 15, the frame 80 may include a pressed portion 811, an inclined portion 812, a left support portion 813c, and a left bending portion 80cc. The pressed portion 811 may be formed by being pressed rearward from the front surface of the frame 80. The inclined portion 812 may be bent obliquely forward from a left side of the pressed portion 811. The left support portion 813c may be bent leftward from the inclined portion 812. The left bending portion 80cc may be bent forward from the left support portion 813c. The left bending portion 80cc may be referred to as a left rib or a left wall.

A left hole 813c1, 813c2 may be formed through the left support portion 813c in the front-and-rear direction. For example, a portion of the left hole 813c1, 813c2 may be formed through the left bending portion 80cc in the left-and-right direction. As another example, the left hole 813c1, 813c2 may be offset from the left bending portion 80cc. A first left hole 813c1 and a second left hole 813c2 may be spaced apart from each other in the up-and-down direction. The first left hole 813c1 and the second left hole 813c2 may have the same shape, namely, an oval shape. In this case, a left coupling portion 923a, 923b, which will be described below, may have a head made of an elastic material to allow the head to pass through the left hole 813c1, 813c2 having a smaller diameter than the head.

The left holder 92 may be positioned at the front of the frame 80. The left holder 92 may include a left body 920, left protrusions 922, and the left coupling portion 923a, 923b. For example, the left body 920, the left protrusions 922, and the left coupling portion 923a, 923b may be formed as one body. The left holder 92 may have elasticity.

The left body 920 may be elongated in the up-and-down direction. The left body 920 may have a generally cuboid shape that is vertically long.

A plurality of left protrusions 922 may be formed on a right surface of the left body 920. The plurality of left protrusions 922 may be formed at regular intervals, and may have a generally comb shape.

The left coupling portion 923a, 923b may protrude rearward from a rear surface of the left body 920. A first left coupling portion 923a may be adjacent to an upper end of the left body 920, and may be aligned with the first left hole 813c1. A second left coupling portion 923b may be adjacent to a lower end of the left body 920, and may be aligned with the second left hole 813c2. Each of the first left coupling portion 923a and the second left coupling portion 923b may include a neck protruding from the left body 920 and a head connected to the neck. A diameter of the head may be greater than a diameter of the neck. The left hole 813c1, 813c2 may have a diameter equal or similar to the diameter of the neck and less than the diameter of the head. For example, the diameter of the head may be 0.6 to 0.8 mm greater than the diameter of the left hole 813c1, 813c2. For example, the sum of lengths of the neck and the head may be 0.3 to 0.4 mm greater than a thickness of the left support portion 813c.

Meanwhile, a lower support portion 813b may extend horizontally between a lower end of the left support portion 813c and a lower end of the right support portion 813d. A lower bending portion 80bb may be bent rearward from the lower support portion 813b. The lower bending portion 80bb may be referred to as a lower rib or a lower wall.

Referring to FIGS. 16 and 17, the left body 920 may be seated on the left support portion 813c. A left surface of the left body 920 may be in contact with an inner surface of the left bending portion 80cc. Thus, the left bending portion 80cc may limit or restrict leftward movement of the left holder 92.

The left coupling portion 923a, 923b may be inserted into and coupled to the left hole 813c1, 813c2 (see FIG. 15). In detail, the neck of the left coupling portion 923a, 923b may pass through the left hole 813c1, 813c2, and the head of the left coupling portion 923a, 923b may be engaged with a rear surface of the left support portion 813c. Thus, the coupling structure between the left coupling portion 923a, 923b and the left hole 813c1, 813c2 may limit or restrict the up and down movement and back and forth movement of the left holder 92.

The above description of the left holder 92 is equally applicable to the first left holder 92a and the second left holder 92b.

Referring to FIG. 18, the frame 80 may include a flat portion 81. The flat portion 81 may define the front surface of the frame 80. A heat sink 83 may cover the front of the flat portion 81, and may be coupled to the flat portion 81. A front surface of the heat sink 83 may be flat.

A side portion 70 may be disposed at an edge of the heat sink 83. The side portion 70 may include at least one of a metal or a metal oxide as a reflective material. For example, the side portion 70 may include a metal and/or a metal oxide having a high reflectance such as at least one of aluminum (Al), silver (Ag), gold (Au), or titanium dioxide (TiO2). For example, resin may be deposited on or applied to the side portion 70.

In addition, the side portion 70 may include a first side portion 71, a second side portion 72, a third side portion 73, and a fourth side portion 74. The side portion 70 may be referred to as a chamfer portion.

Referring to FIG. 19, the substrate 40 may cover the front of the heat sink 83, and may be coupled to the heat sink 83. For example, the substrate 40 may include at least one of polycarbonate (PC), polyethylene terephthalate (PET), glass, or silicon. The substrate 40 may be a printed circuit board (PCB).

For example, the substrate 40 may have a quadrangular plate shape. As another example, the substrate 40 may have a strap shape that is horizontally long (see FIG. 3). As another example, the substrate 40 may include a first plate that is vertically long and a plurality of second plates that extend horizontally from the first plate in an elongated manner, so as to have a generally fork shape.

At least one substrate 40 may be provided. The substrate 40 may include a plurality of substrates 41, 42, 43, 44, 45, 46, 47, 48, and 49 adjacent to each other. A first substrate 41, a second substrate 42, a third substrate 43, a fourth substrate 44, a fifth substrate 45, a sixth substrate 46, a seventh substrate 47, an eighth substrate 48, and a ninth substrate 49 may be coupled to a first area 83A1, a second area 83A2, a third area 83A3, a fourth area 83A4, a fifth area 83A5, a sixth area 83A6, a seventh area 83A7, an eighth area 83A8 and a ninth area 83A9 of the heat sink 83, respectively.

A plurality of lenses 53 may respectively cover a plurality of light sources 51 mounted on the substrate 40. A power supply (not shown) of the display device may supply power to the light sources 51 through connectors (not shown) mounted on a rear surface of the substrate 40.

The reflective sheet 60 may cover the front of the substrate 40, and may be coupled to the substrate 40. The lenses 53 may be positioned in respective holes 60a of the reflective sheet 60. For example, the reflective sheet 60 may have a quadrangular plate shape.

At least one reflective sheet 60 may be provided. The reflective sheet 60 may include a plurality of reflective sheets 61, 62, 63, 64, 65, 66, 67, 68, and 69 adjacent to each other. A first reflective sheet 61, a second reflective sheet 62, a third reflective sheet 63, a fourth reflective sheet 64, a fifth reflective sheet 65, a sixth reflective sheet 66, a seventh sheet 67, an eighth reflective sheet 68, and a ninth reflective sheet 69 may be coupled to the first substrate 41, the second substrate 42, the third substrate 43, the fourth substrate 44, the fifth substrate 45, the sixth substrate 46, the seventh substrate 47, the eighth substrate 48, and the ninth substrate 49, respectively.

Referring to FIGS. 20 and 21, an upper side of the diffusion plate 31 may be adjacent to or in contact with the bottom of the upper protrusions 912a, 912b of the upper holder 91. A right side of the diffusion plate 31 may be adjacent to or in contact with the left side of the right protrusions 932 (see FIG. 14) of the right holder 93. A left side of the diffusion plate 31 may be adjacent to or in contact with the right side of the left protrusions 922 (see FIG. 17) of the left holder 92. A lower side of the diffusion plate 31 may be adjacent to or seated on a support portion 80e. A plurality of support portions 80e may protrude forward from the lower support portion 813b (see FIG. 15), and may be spaced apart from each other in the left-and-right direction.

Accordingly, the diffusion plate 31 may be positioned between the upper holder 91, the right holder 93, the left holder 92, and the support portion 80e. In addition, an upper gap (no reference numeral) may be formed between the upper side of the diffusion plate 31 and the upper bending portion 80aa, a right gap (no reference numeral) may be formed between the right side of the diffusion plate 31 and the right bending portion 80dd, and a left gap (no reference numeral) may be formed between the left side of the diffusion plate 31 and the left bending portion 80cc (see FIG. 17).

Here, the diffusion plate 31 may be deformed. For example, when the display device is operated, the temperature of the diffusion plate 31 may be increased, which may cause deformation of the diffusion plate 31. The upper gap, the right gap, and the left gap may be gaps for thermal expansion or contraction of the diffusion plate 31. The protrusions 912a, 912b, 932, and 922 may be laid on their side when pushed by the diffusion plate 31, and may be gradually restored to their original state when the force applied to the protrusions 912a, 912b, 932, and 922 by the diffusion plate 31 is released. That is, the protrusions 912a, 912b, 932, and 922 may prevent or suppress movement of the diffusion plate 31. In addition, the holders 91, 92, and 93 may prevent light from leaking from the diffusion plate 31 toward the edge of the frame 80.

Meanwhile, the diffusion plate 31 may be spaced forward from the reflective sheet 60 (see FIG. 6). The supporter 39 (see FIG. 6) may support the diffusion plate 31 between the diffusion plate 31 and the reflective sheet 60.

The optical sheet 32a, 32b may be positioned at the front of the diffusion plate 31. The optical sheet 32a, 32b may be coupled to the front surface of the diffusion plate 31. A sheet coupling portion 32d of the optical sheet 32a, 32b may be hung on the protruding portion 80aad.

Referring to FIG. 8 and FIG. 22, an upper engaging hole 80aah may be formed through the upper bending portion 80aa in the up-and-down direction. For example, a portion of the upper engaging hole 80aah may be formed through the upper support portion 813a in the left-and-right direction. As another example, the upper engaging hole 80aah may be offset from the upper support portion 813a. The upper engaging hole 80aah may be elongated horizontally.

For example, the upper engaging hole 80aah may be located at each of two points tp1 of the upper bending portion 80aa. The upper engaging hole 80aah located at one of the two points tp1 may be adjacent to the second upper holder 91b (see FIG. 7). The upper engaging hole 80aah located at the other of the two points tp2 may be adjacent to the fourth upper holder 91d (see FIG. 7).

Referring to FIG. 13 and FIG. 22, a right engaging hole 80ddh may be formed through the right bending portion 80dd in the left-and-right direction. For example, a portion of the right engaging hole 80ddh may be formed through the right support portion 813d in the front-and-rear direction. As another example, the right engaging hole 80ddh may be offset from the right support portion 813d. The right engaging hole 80ddh may be elongated vertically.

For example, the right engaging hole 80ddh may be located at one point, namely, a point tp2 of the right bending portion 80dd. The right engaging hole 80ddh located at the point tp2 may be adjacent to the first right holder 93a.

A left engaging hole (not shown) and the right engaging hole 80ddh may be left-right symmetric with respect to a vertical line passing through the center of the frame 80. That is, the left engaging hole may be formed through the left bending portion 80cc (see FIG. 16) in the left-and-right direction. For example, the left engaging hole may be located at one point, namely, a point tp3, and may be adjacent to the first left holder 92a (see FIG. 7).

Referring to FIGS. 21 and 22, a lower engaging protrusion 80f may protrude downward from the lower bending portion 80bb. For example, the lower engaging protrusion 80f may be formed by being pressed downward from an upper surface of the lower bending portion 80bb. A plurality of lower engaging protrusions 80f may be spaced apart from each other along the lower bending portion 80bb (see tp4).

Referring back to FIG. 22, a guide panel 20 may include a first part 21, a second part 22, a third part 23, and a fourth part 24. The guide panel 20 may be referred to as a side frame.

The first part 21 may be elongated horizontally. The third part 23 may be bent downward at a left end of the first part 21 and may be elongated vertically. The second part 22 may be bent rightward at a lower end of the third part 23 and may be elongated horizontally. The fourth part 24 may be bent upward at a right end of the second part 22 and may be elongated vertically. An upper end of the fourth part 24 may be connected to a right end of the first part 21. The guide panel 20 may be detachably coupled to the frame 80 at a plurality of points tp1, tp2, tp3, and tp4.

Referring to FIG. 23, an upper engaging protrusion 21Va may be formed on an inner surface of a first vertical portion 21V of the first part 21. The upper engaging protrusion 21Va may be engaged in the upper engaging hole 80aah. For example, the coupling structure between the upper engaging protrusion 21Va and the upper engaging hole 80aah may be achieved at a plurality of points tp1 (see FIG. 22). Accordingly, the upper engaging protrusion 21Va and the upper engaging hole 80aah may guide the coupling of the first part 21 and the frame 80, and the first part 21 may be detachably coupled to the frame 80.

Referring to FIG. 24, a right engaging protrusion 24Va may be formed on an inner surface of a fourth vertical portion 24V of the fourth part 24. The right engaging protrusion 24Va may be engaged in the right engaging hole 80ddh. For example, the coupling structure between the right engaging protrusion 24Va and the right engaging hole 80ddh may be achieved at least at one point tp2. Accordingly, the right engaging protrusion 24Va and the right engaging hole 80ddh may guide the coupling of the fourth part 24 and the frame 80, and the fourth part 24 may be detachably coupled to the frame 80.

A left engaging protrusion (not shown) and the right engaging protrusion 24Va may be left-right symmetric with respect to a vertical line passing through the center of the frame 80. That is, the left engaging protrusion may be formed on an inner surface of a third vertical portion of the third part 23. The left engaging protrusion may be detachably coupled to the left engaging hole. The left engaging protrusion and the left engaging hole may guide the coupling of the third part 23 and the frame 80, and the third part 23 may be detachably coupled to the frame 80.

Referring to FIG. 25, a lower engaging hole 22Vh may be formed through a vertical portion 22V of the second part 22 in the up-and-down direction. The lower engaging protrusion 80f may be engaged in the lower engaging hole 22Vh. For example, the coupling structure between the lower engaging protrusion 80f and the lower engaging hole 22Vh may be achieved at a plurality of points tp4 (see FIG. 22). Accordingly, the lower engaging protrusion 80f and the lower engaging hole 22Vh may guide the coupling of the second part 22 and the frame 80, and the second part 22 may be detachably coupled to the frame 80.

Referring to FIG. 26, the first part 21 may extend along an upper side of the display panel 10, and may cover the top of the display panel 10 and the frame 80. The first part 21 may include a first vertical portion 21V and a first horizontal portion 21H.

A first groove 21g may be formed from a rear surface of the first vertical portion 21V toward an inside of the first vertical portion 21V, so as to allow the upper bending portion 80aa of the frame 80 to be inserted therein.

A first front pad FP1 may be positioned between the display panel 10 and the first horizontal portion 21H, and may be coupled to a front surface of the first horizontal portion 21H. A first rear pad RP1 may be positioned between the first horizontal portion 21H and the optical sheet 32, and may be coupled to a rear surface of the first horizontal portion 21H.

The first side portion 71 may extend along an upper side of the heat sink 83, and may be disposed obliquely toward the display panel 10. The first side portion 71 may include a first seating portion 711 and a first engaging portion 712.

The first seating portion 711 may be bent upward at a front end of the first side portion 71, and may be positioned between the first horizontal portion 21H and the upper support portion 813a. A portion of the diffusion plate 31 may be positioned between the first horizontal portion 21H and the first seating portion 711, and may press the first seating portion 711 toward the upper support portion 813a.

The first engaging portion 712 may be bent downward at a rear end of the first side portion 71, and may be positioned between the heat sink 83 and the pressed portion 811. The first engaging portion 712 may be engaged with a rear surface of the heat sink 83.

Referring to FIG. 27, the second part 22 of the side frame 20 may extend along a lower side of the frame 80, and may cover the bottom of the frame 80. The second part 22 may be positioned between the lower side of the frame 80 and an under cover 29. The second part 22 may include a second vertical portion 22V and a second horizontal portion 22H.

The lower bending portion 80bb of the frame 80 may be positioned on the second vertical portion 22V.

A second front pad FP2 may be positioned between the display panel 10 and the second horizontal portion 22H, and may be coupled to a front surface of the second horizontal portion 22H. A second rear pad RP2 may be positioned between the second horizontal portion 22H and the optical sheet 32, and may be coupled to a rear surface of the second horizontal portion 22H.

The second side portion 72 may extend along a lower side of the heat sink 83, and may be disposed obliquely toward the display panel 10. The second side portion 72 may include a second seating portion 721 and a second engaging portion 722.

The second seating portion 721 may be bent downward at a front end of the second side portion 72, and may be positioned between the second horizontal portion 22H and the lower support portion 813b. A portion of the diffusion plate 31 may be positioned between the second horizontal portion 22H and the second seating portion 721, and may press the second seating portion 721 toward the lower support portion 813b.

The second engaging portion 722 may be bent upward at a rear end of the second side portion 72, and may be positioned between the heat sink 83 and the pressed portion 811. The second engaging portion 722 may be engaged with the rear surface of the heat sink 83.

Referring to FIG. 28, the third part 23 of the side frame 20 may extend along a left side of the display panel 10, and may cover the left side of the display panel 10 and the frame 80. The third part 23 may include a third vertical portion 23V and a third horizontal portion 23H.

A third groove 23g may be formed from a rear surface of the third vertical portion 23V toward an inside of the third vertical portion 23V, so as to allow the left bending portion 80cc of the frame 80 to be inserted therein.

A third front pad FP3 may be positioned between the display panel 10 and the third horizontal portion 23H, and may be coupled to a front surface of the third horizontal portion 23H. A third rear pad RP3 may be positioned between the display panel 10 and the optical sheet 32, and may be coupled to a rear surface of the third horizontal portion 23H.

The third side portion 73 may extend along a left side of the heat sink 83, and may be disposed obliquely toward the display panel 10. The third side portion 73 may include a third seating portion 731 and a third engaging portion 732.

The third seating portion 731 may be bent leftward at a front end of the third side portion 73, and may be positioned between the third horizontal portion 23H and the left support portion 813c. A portion of the diffusion plate 31 may be positioned between the third horizontal portion 23H and the third seating portion 731, and may press the third seating portion 731 toward the left support portion 813c.

The third engaging portion 732 may be bent rightward at a rear end of the third side portion 73, and may be positioned between the heat sink 83 and the pressed portion 811. The third engaging portion 732 may be engaged with the rear surface of the heat sink 83.

Referring to FIG. 29, the fourth part 24 of the side frame 20 may extend along a right side of the display panel 10, and may cover the right side of the display panel 10 and the frame 80. The fourth part 24 may include a fourth vertical portion 24V and a fourth horizontal portion 24H.

A fourth groove 24g may be formed from a rear surface of the fourth vertical portion 24V toward an inside of the fourth vertical portion 24V, so as to allow the right bending portion 80dd of the frame 80 to be inserted therein.

A fourth front pad FP4 may be positioned between the display panel 10 and the fourth horizontal portion 24H, and may be coupled to a front surface of the fourth horizontal portion 24H. A fourth rear pad RP4 may be positioned between the display panel 10 and the optical sheet 32, and may be coupled to a rear surface of the fourth horizontal portion 24H.

The fourth side portion 74 may extend along a right side of the heat sink 83, and may be disposed obliquely toward the display panel 10. The fourth side portion 74 may include a fourth seating portion 741 and a fourth engaging portion 742.

The fourth seating portion 741 may be bent rightward at a front end of the fourth side portion 74, and may be positioned between the fourth horizontal portion 24H and the right support portion 813d. A portion of the diffusion plate 31 may be positioned between the fourth horizontal portion 24H and the fourth seating portion 741, and may press the fourth seating portion 741 toward the right support portion 813d.

The fourth engaging portion 742 may be bent leftward at a rear end of the fourth side portion 74, and may be positioned between the heat sink 83 and the pressed portion 811. The fourth engaging portion 742 may be engaged with the rear surface of the heat sink 83.

Referring to FIGS. 1 to 29, a display device according to an aspect of the present disclosure may include: a display panel; a frame positioned behind the display panel; a light source providing light to the display panel; an optical plate positioned between the display panel and the light source; a frame which is opposite to the display panel with respect to the optical plate and on which the optical plate is seated; and a holder adjacent to one side of the optical plate and coupled onto the frame, the holder may include: a plurality of protrusions formed at one surface of the holder that faces the one side of the optical plate; and a coupling portion protruding from the holder toward the frame, passing through the frame, and engaged with a rear surface of the frame.

One side of the frame may face the one side of the optical plate, and a gap may be formed between the one side of the frame and the one side of the optical plate.

The frame may include a hole formed through the frame in a front-rear direction and having an oval shape, the coupling portion may include: a neck protruding rearward from the holder and passing through the hole; and a head connected to the neck, having a diameter greater than a diameter of the hole, and made of an elastic material.

The holder may be elongated along one side of the frame, the coupling portion may include a pair of coupling portions spaced apart from each other in a longitudinal direction of the holder, and the hole may include a pair of holes aligned with the pair of coupling portions, respectively.

The frame may include: a flat portion facing the optical plate; an inclined portion bent obliquely forward from an edge of the flat portion; and a support portion bent from the inclined portion in a direction parallel to the optical plate and on which the optical plate is seated, and the coupling portion of the holder may pass through the support portion and may be engaged with a rear surface of the support portion.

The frame may further include a bending portion bent forward from the support portion, and the other surface of the holder opposite to the one surface of the holder may contact an inner surface of the bending portion.

The holder may include: a plurality of upper holders adjacent to an upper side of the optical plate, and spaced apart from each other along the upper side; a plurality of right holders adjacent to a right side of the optical plate, and spaced apart from each other along the right side; and a plurality of left holders adjacent to a left side of the optical plate, and spaced apart from each other along the left side.

The frame may include a plurality of support portions which protrude forward from a lower side of the frame, which are adjacent to a lower side of the optical plate, and which are spaced apart from each other along the lower side.

The frame may include an insertion portion formed by being recessed downward from an upper side of the frame, and forming a step with respect to a front end of the upper side of the frame, wherein each of the plurality of upper holders may include: an upper body which is elongated along the upper side of the optical plate, and to which the plurality of protrusions and the coupling portion are formed; a middle part formed at a central portion of the upper body; and an insertion groove positioned between the upper body and the middle part, and formed along the insertion portion, and the middle part may be seated on the insertion portion when the insertion portion is inserted into the insertion groove.

One end of the middle part may be adjacent to one end of the upper body, may protrude upward from an upper surface of the upper body, and may be positioned at the step between the upper side of the frame and the insertion portion, and the other end of the middle part may be adjacent to the other end of the upper body, may protrude upward from the upper surface of the upper body, and may be positioned at the step between the upper side of the frame and the insertion portion.

The display device may further include an optical sheet positioned at a front of the optical plate, the optical sheet may include a sheet coupling portion protruding upward from an upper side of the optical sheet, the frame may further include a protruding portion protruding forward from a front end of the insertion portion, positioned under the middle part, and to which the sheet coupling portion is coupled.

The display device may further include: a guide panel covering an edge of the frame, the frame may include an engaging hole formed through one side of the frame, the guide panel may include an engaging protrusion formed at an inner surface of the guide panel and detachably engaged in the engaging hole, and the holder may contact an inner surface of a portion of the frame forming the one side of the frame.

The display device may further include a guide panel extending along an edge of the frame, the frame may include an engaging protrusion protruding outward from one side of the frame, the guide panel may include an engaging hole formed through the guide panel and in which the engaging protrusion is detachably engaged, and the holder may contact an inner surface of a portion of the frame forming the one side of the frame.

The display device may further include a guide panel extending along an edge of the display panel, and coupled to the display panel and the frame between the display panel and the frame, the frame may include a bending portion forming an end of the frame and inserted inside the guide panel, and the holder may contact an inner surface of the bending portion. The optical plate may be a diffusion plate or a light guide plate.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the present disclosure should be determined by reasonable interpretation of the appended claims, and all changes coming within the equivalency range of the present disclosure are intended to be embraced in the scope of the present disclosure.

The invention claimed is:

1. A display device comprising:
   a display panel;
   a frame positioned behind the display panel;
   an optical plate positioned between the display panel and the frame;
   an optical sheet positioned between the display panel and the optical plate;
   a light source providing light to the optical plate; and
   a holder adjacent to one side of the optical plate and coupled to the frame,
   wherein the holder comprises:
   a protrusion formed at one side of the holder that faces the one side of the optical plate,
   wherein the optical sheet comprises:
   a cover portion covering a front side of the optical plate; and
   a sheet coupling portion extending from the cover portion, and covering a front side of the holder, and
   wherein the frame comprises:
   a protruding portion adjacent to the one side of the holder, and penetrating the sheet coupling portion.

2. The display device of claim 1, wherein one side of the frame faces the one side of the optical plate, and
   wherein a gap is formed between the one side of the frame and the one side of the optical plate.

3. The display device of claim 1, wherein the holder comprises a coupling portion protruding from the holder toward the frame, and engaged with a rear surface of the frame,
- wherein the frame comprises a hole formed through the frame in a front-rear direction and having an oval shape, and
- wherein the coupling portion comprises:
- a neck protruding rearward from the holder and passing through the hole; and
- a head connected to the neck, having a diameter greater than a diameter of the hole, and made of an elastic material.

4. The display device of claim 3, wherein the holder is elongated along one side of the optical plate,
- wherein the coupling portion comprises a pair of coupling portions spaced apart from each other in a longitudinal direction of the holder, and
- wherein the hole comprises a pair of holes aligned with the pair of coupling portions, respectively.

5. A display device comprising:
- a display panel;
- a light source providing light to the display panel;
- an optical plate positioned between the display panel and the light source;
- a frame which is opposite to the display panel with respect to the optical plate and on which the optical plate is seated; and
- a holder adjacent to one side of the optical plate and coupled onto the frame,
- wherein the holder comprises:
- a plurality of protrusions formed at one surface of the holder that faces the one side of the optical plate; and
- a coupling portion protruding from the holder toward the frame, passing through the frame, and engaged with a rear surface of the frame,
- wherein the frame comprises:
- a flat portion facing the optical plate;
- an inclined portion bent obliquely forward from an edge of the flat portion; and
- a support portion bent from the inclined portion in a direction parallel to the optical plate and on which the optical plate is positioned, and
- wherein the holder further comprises a coupling portion protruding from the holder, passing through the support portion, and engaged with a rear surface of the support portion.

6. The display device of claim 5, wherein the frame further includes a bending portion bent forward from the support portion, and
- wherein the other surface of the holder opposite to the one surface of the holder contacts an inner surface of the bending portion.

7. The display device of claim 1, wherein the holder further comprises:
- a plurality of upper holders adjacent to an upper side of the optical plate, and spaced apart from each other along the upper side;
- a plurality of right holders adjacent to a right side of the optical plate, and spaced apart from each other along the right side; and
- a plurality of left holders adjacent to a left side of the optical plate, and spaced apart from each other along the left side.

8. The display device of claim 7, wherein the frame comprises a plurality of support portions which protrude forward from a lower side of the frame, which are adjacent to a lower side of the optical plate, and which are spaced apart from each other along the lower side.

9. A display device comprising:
- a display panel;
- a light source providing light to the display panel;
- an optical plate positioned between the display panel and the light source;
- a frame which is opposite to the display panel with respect to the optical plate and on which the optical plate is seated; and
- a holder adjacent to one side of the optical plate and coupled onto the frame,
- wherein the holder comprises:
- a plurality of protrusions formed at one surface of the holder that faces the one side of the optical plate; and
- a coupling portion protruding from the holder toward the frame, passing through the frame, and engaged with a rear surface of the frame,
- wherein the holder further comprises:
- a plurality of upper holders adjacent to an upper side of the optical plate, and spaced apart from each other along the upper side;
- a plurality of right holders adjacent to a right side of the optical plate, and spaced apart from each other along the right side; and
- a plurality of left holders adjacent to a left side of the optical plate, and spaced apart from each other along the left side,
- wherein the frame comprises an insertion portion formed by being recessed downward from an upper side of the frame, and forming a step with respect to a front end of the upper side of the frame,
- wherein each of the plurality of upper holders comprises:
- an upper body which is elongated along the upper side of the optical plate, and to which the protrusion is formed;
- a middle part formed at a central portion of the upper body; and
- an insertion groove positioned between the upper body and the middle part, and formed along the insertion portion, and
- wherein the middle part is positioned on the insertion portion when the insertion portion is inserted into the insertion groove.

10. The display device of claim 9, wherein one end of the middle part is adjacent to one end of the upper body, protrudes upward from an upper surface of the upper body, and is positioned at the step between the upper side of the frame and the insertion portion, and
- wherein the other end of the middle part is adjacent to the other end of the upper body, protrudes upward from the upper surface of the upper body, and is positioned at the step between the upper side of the frame and the insertion portion.

11. The display device of claim 9, further comprising:
- an optical sheet positioned between the display panel and the optical plate,
- wherein the optical sheet comprises:
- a cover portion covering a front side of the optical plate; and
- a sheet coupling portion extending from the cover portion, and covering a front side of the holder,
- wherein the frame comprises:
- a protruding portion adjacent to the one side of the holder, and penetrating the sheet coupling portion; and
- an insertion portion formed by being recessed downward from an upper side of the frame, wherein the sheet coupling portion of the optical sheet protrudes upward from an upper side of the optical sheet, and wherein the protruding portion of the frame protrudes forward from a front end of the insertion portion, positioned under the middle part, and to which the sheet coupling portion is coupled.

12. The display device of claim 1, further comprising a guide panel covering an edge of the frame, wherein the frame comprises an engaging hole formed through one side of the frame, wherein the guide panel comprises an engaging protrusion formed at an inner surface of the guide panel and detachably engaged in the engaging hole, and wherein the holder contacts an inner surface of a portion of the frame forming the one side of the frame.

13. The display device of claim 1, further comprising a guide panel extending along an edge of the frame, wherein the frame comprises an engaging protrusion protruding outward from one side of the frame, wherein the guide panel comprises an engaging hole formed through the guide panel and in which the engaging protrusion is detachably engaged, and wherein the holder contacts an inner surface of a portion of the frame forming the one side of the frame.

14. The display device of claim 1, further comprising a guide panel extending along an edge of the display panel, and coupled to the display panel and the frame between the display panel and the frame, wherein the frame includes a bending portion forming an end of the frame and inserted inside the guide panel, and wherein the holder contacts an inner surface of the bending portion.

15. The display device of claim 1, wherein the protrusion of the holder comprises:

a first protrusion; and, a second protrusion spaced apart from the first protrusion, wherein the protruding portion is positioned between the first protrusion and the second protrusion.

* * * * *